United States Patent [19]
Mos et al.

[11] Patent Number: 5,770,846
[45] Date of Patent: Jun. 23, 1998

[54] METHOD AND APPARATUS FOR SECURING AND AUTHENTICATING ENCODED DATA AND DOCUMENTS CONTAINING SUCH DATA

[76] Inventors: Robert Mos, 2637 Mission Blvd.; Clay Von Mueller, 804 Anacapa Ct.; Denise Jefferys, 2637 Mission Blvd., all of San Diego, Calif. 92109

[21] Appl. No.: 602,214

[22] Filed: Feb. 15, 1996

[51] Int. Cl.$^6$ ............................................. G06K 7/00
[52] U.S. Cl. ............................. 1235/440; 360/2; 235/449; 380/3; 380/25
[58] Field of Search .................. 235/440, 449; 360/2

[56] References Cited

U.S. PATENT DOCUMENTS

| | | | |
|---|---|---|---|
| 3,898,689 | 8/1975 | D'Orazio et al. | 360/40 |
| 4,041,279 | 8/1977 | Foote | 235/440 |
| 4,628,195 | 12/1986 | Baus | 235/440 |
| 5,235,166 | 8/1993 | Fernandez | 235/449 |
| 5,239,166 | 8/1993 | Graves | 235/380 |
| 5,254,843 | 10/1993 | Hynes et al. | 235/449 |
| 5,336,871 | 8/1994 | Colgate, Jr. | 235/380 |
| 5,354,097 | 10/1994 | Tel | 283/72 |
| 5,650,606 | 7/1997 | Baus, Jr. | 235/449 |

OTHER PUBLICATIONS

Transaction Card Technology Fraud, XSec® The Solution, 3 Dec. 1994, D. Jeffries.
Introduction to Magnetic Recording, Edited by Robert M. White, pp. 142–164.

*Primary Examiner*—Thomas H. Tarcza
*Assistant Examiner*—Pinchus M. Laufer
*Attorney, Agent, or Firm*—Baker, Maxham Jester & Meador

[57] ABSTRACT

A method and apparatus for determining the distance between transitions from a first logical state to a second logical state stored on a medium (i.e., a document). This determination is used to precisely characterize the information pattern in order to authenticate the information and the medium on which the information is stored. The invention uses a reader having a leading and trailing read apparatus which allow information to be read simultaneously from two or more locations spaced a known distance apart. The distance between the centerlines of each read apparatus is preferably an odd integer multiple of one half the distance between logical clock transitions. The distance between a first transition at the leading read apparatus and a next transition at the trailing read apparatus is used as a reference (i.e., the "Reference Value"). The Reference Value is compared with the distance between the first transition and the next transition on the medium (i.e., the "Jitter Value"). Detection of an deviations in spacing between transitions is unaffected by variations in the velocity of the medium with respect to the reader.

26 Claims, 16 Drawing Sheets

METHOD AND APPARATUS FOR SECURING AND AUTHENTICATING ENCODED DATA AND DOCUMENTS CONTAINING SUCH DATA

BACKGROUND OF THE INVENTION

1. Field of the Invention

This invention relates to reading and writing information on a storage medium, and more particularly to a method and apparatus for authenticating the medium and information stored on the medium by performing spatial measurements.

2. Description of Related Art

In many instances, it is desirable to provide a method and apparatus for storing and transporting information. In particular, many ways have been devised for encoding information on a medium which can be conveniently carried about by a person during the normal course of business. For example, credit cards, debit cards, electronic purse cards, decrementing value cards, checks, driver's licenses, identification cards, access control cards, magnetic tapes and disks, and many other such media which are small enough to be conveniently carried in a person's handbag or wallet are ubiquitous today. However, in many of the applications in which these media are intended to be used, security is an important concern. That is, it is important that only authorized organizations are capable of modifying the information stored thereon. One very common way for information to be stored on such a medium is by magnetically encoding the information. Techniques for encoding information on magnetic media have been available for many years and are now relatively inexpensive. Other techniques include optical storage techniques and printed information using relative light and dark areas, such as the uniform purchasing codes (UPCs) which are printed on the packaging of most products today. For simplicity sake, only magnetic techniques are discussed in detail. However, it will be understood that the following discussion applies equally well to other techniques for storing information.

Magnetically encoded information can easily be copied or transferred from one magnetic information storage medium to another. Unless special provisions are made to secure the information, information can be altered and re-encoded back onto the original medium or a duplicate of the original medium. If the information is used in a system for organizing financial transactions or for personal identification, then such copying, altering, and duplicating makes the person for whom the information was intended, and the organization who operates the system, vulnerable to fraud. For example, if a magnetic stripe affixed to a debit card is used to indicate how much money is currently in a personal account, modifications to that information can be used to increase the apparent balance in order to purchase goods which have a higher value than actually exists in the account. Additionally, if the card is duplicated, the same account could be used by more than one person. It should be clear that fraud could occur in a number of ways if sensitive information is not properly secured. In fact fraud due to copying and modification of information magnetically encoded on portable media, such as magnetic stripe cards, is growing at an alarming rate. For example, it is estimated that the cost of fraud to the credit card industry alone will exceed one billion dollars per year before the end of the century.

A number of techniques have been proposed to authenticate both the information, and the medium on which the information is stored (commonly referred to as a "document"), in order to prevent fraud. For example, U.S. Pat. No. 4,023,204 issued to Lee, discloses using a unique magnetic coating with pre-determined alignment of the magnetic particles as the basis for authentication measurements. Thus, a code which can not be altered can be implanted into the document to authenticate the document. U.S. Pat. No. 5,336,871 issued to Colgate, discloses the use of a hologram to authenticate a substrate on which a magnetic stripe is affixed. U.S. Pat. 5,354,097, issued to Tel, discloses the use of overlays to authenticate information. U.S. Pat. No. 4,628,195, issued to Baus, discloses generating a security code number determined by the relative spatial positions of corresponding data in two different forms of encoded data on a card. In particular, Baus discloses using a conventional magnetic stripe as the first means for encoding data, and using embossed characters as a second means for encoding data. The relative position of the magnetic information with respect to the embossed information is used to generate a numeric security code. In addition, dyes or absorbers incorporated in a magnetic stripe have been used to attempt to encode a security identifier into the document on which the information resides.

However, each of these methods requires the use of special materials in the security process. Accordingly, none of the old documents would be usable, and all of the documents currently in use would have to be recalled and reissued using the new security process. Recalling and replacing all of the documents that are currently in use would be very costly and has hampered the widespread implementation of such technologies.

In the case of the technique disclosed by Baus, both an automatic reading method for reading the magnetic stripe, and also an automatic reading method for reading the embossed characters, are required. Therefore, there are two sub-systems required by this technique. Furthermore, readers used at the point-of-sale must preserve the spatial relationship between the magnetically stored information and the embossed characters. This is a cumbersome and expensive process which is very difficult to perform at the point-of-sale. Accordingly, it may be difficult to maintain reliable operation of systems which conform to the Baus technique.

Others have attempted to overcome the above limitations when the document is a magnetic medium by employing characteristics of the magnetic signals used to store the information to authenticate both the document and the information stored thereon. For example, U.S. Pat. No. 4,837.426 issued to Pease, discloses a method for authenticating documents by analyzing the amplitude of the magnetic signals. U.S. Pat. Nos. 5,408,,505 and 5,428,683, each issued to Indeck, et al. disclose a method for authenticating documents using "noise" in the saturation region of the magnetic data. U.S. Pat. Nos. 5,235,166, and 5,430,279, each issued to Fernandez, and U.S. Pat. 5,254, 843 issued to Hynes, each disclose a method of authenticating documents by deriving inherent temporal measurements of timing variations of the data in the reading process. All of the above mentioned methods for authenticating documents and information using characteristics of the magnetic signals have a common drawback in that variations in the motion of the document through the reading device cause variations in the characteristics used to authenticate the document, and therefore. result in errors in the authentication process. Furthermore, degradation of the reading device and the document over time due to natural wear causes the characteristics to either change, or to appear to change, causing further errors in the authentication process.

Accordingly, it would be desirable to provide a system which: (1) is capable of authenticating documents and the information stored thereon without use of a new material or process for generating the document to be authenticated; (2) is unaffected by changes in the speed at which the document moves with respect to the reader; and (3) will remain reliable over time.

In addition to the problems associated with authenticating documents and the information that is stored thereon, there is a need for methods for increasing the amount of information that can be stored on a document. For example, a magnetic stripe of a credit card is a relatively small area on which information can be stored. Accordingly, it would be advantageous to provide a method and apparatus which increases the amount of information that can be stored on a document.

Still further, in order to maintain standards for writing information on documents, it would be advantageous to be able to accurately determine the absolute distance between a transition in the information stored on a document from a first logical state to a second logical state without the need to control the velocity of the reader with respect to the document.

SUMMARY OF THE INVENTION

The present invention is a method and apparatus for determining the distance between transitions from a first logical state to a second logical state stored on a medium (i.e. a document). In accordance with one embodiment of the invention, this determination is used to precisely characterize the information pattern in order to authenticate the information and the medium on which the information is stored.

The invention uses a reader having a leading and trailing read apparatus which allows information to be read simultaneously from two or more locations spaced a known distance apart. For example, in accordance with one embodiment of the present invention a magnetic reader is provided having two or more read gaps, each with a magnetic structure and pickup coil for detecting flux transitions (i.e., changes in the direction of lines of flux generated by polarized magnetic particles of a magnetic medium which is passed under the read head). In accordance with standards currently used to write information using a self-clocking data pattern, such as the Manchester code, logical clock transitions occur at regular intervals and logical data transitions occur midway between logical clock transitions. The distance between the centerlines of each read apparatus is preferably an odd integer multiple of one half the distance between logical clock transitions. In an embodiment in which the reader is a magnetic read head, thin film techniques and precise magnetic shims are used to precisely define the spacing between adjacent read gaps (i.e.,"intergap spacing").

Since the distance between the leading and trailing read apparatus is preferably an odd integer multiple of the one half the distance between logical clock transitions stored on the document, the time between detection of a first transition at the leading read apparatus and a next transition at the trailing read apparatus can be used as a reference (i.e., the "Reference Value"). The Reference Value can then be compared with the distance between detection of the first transition at the leading read apparatus and a next transition at the leading read apparatus (i.e., the "Jitter Value"). It should be clear that the Reference Value should be an integer multiple of the Jitter Value, if the leading and trailing read apparatus are spaced apart by an odd integer multiple of one half the ideal distance between adjacent logical clock transitions. Any difference will be due to "jitter" (i.e., spatial deviation from the ideal spacing). The amount of jitter can then be characterized and used as a measure of quality to decode additional information that was encoded using "jitter modulation" (i.e., using the amount of spatial deviation to represent a particular logical state or character), or to establish an authentication signature that is unique to the document or to a particular section of information being read. Depending upon the accuracy with which the deviation is read, a highly secure authentication signature can be derived. That is, by reading the spatial deviation to an accuracy which is not reproducible, a unique authentication signature can be determined for a particular document or section of information.

Since the present invention uses the distance between a leading and trailing read apparatus as reference to determine jitter, no new materials are required to authenticate a document. Furthermore, detection of the authentication signature is unaffected by variations in the velocity of the medium with respect to the reader. Still further, an authentication signature may be accurately detected so long as each logical clock transition can be detected from the document. Further yet, measurements of jitter can be made in accordance with the present invention in order to verify adherence to jitter standards.

BRIEF DESCRIPTION OF THE DRAWING

The objects advantages, and features of this invention will become readily apparent in view of the following description, when read in conjunction with the accompanying drawing, in which.

DETAILED DESCRIPTION OF THE PREFERRED EMBODIMENTS

Throughout this description, the preferred embodiment and examples shown should be considered as exemplars, rather than limitations on the present invention.

Overview

This invention is a method and apparatus for measuring deviations in the spacing between logical transitions used to represent information stored on a medium in accordance with an encoding scheme in which logical transitions must occur at regular intervals, such as Manchester codes. The apparatus includes a reader having at least a leading and trailing read apparatus for detecting logical transitions stored on a medium, such as the point of greatest magnetic flux density, luminance, reflectivity, etc as the medium is scanned by the reader. The leading and trailing read apparatus are preferably separated by an odd integer multiple of one half the ideal length of a bit cell. An absolute measure of the distance between a first and second logical transition can be determined by starting a counter when the first logical transition is detected at the leading read apparatus and stopping the counter when the first logical transition is detected at the trailing read apparatus (referred to as the "Reference Value"). This value is compared to a value taken from a second counter which starts upon detection of the first logical transition and stops upon detection of the second logical transition at the same read apparatus (referred to as the "Jitter Value"). The method and apparatus of the present invention are described in greater detail below.

Medium used with the Invention

Figure 1:
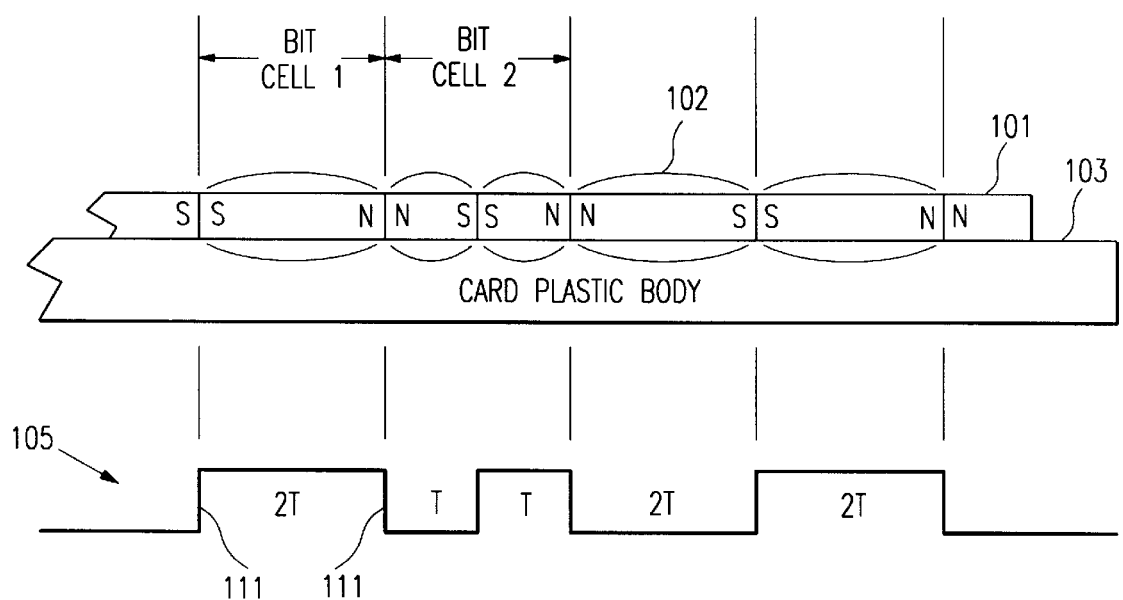
FIG. 1 is an illustration of data encoded on a magnetic stripe which is fixed to a credit card.

FIG. 1 is a longitudinal cross section of data encoded on a magnetic stripe 101 which is fixed to a credit card 103 and the associated current output which is provided by a read apparatus in accordance with the preferred embodiment of this invention. It shall be understood that the magnetic medium is presented as one of many mediums that may be used. Accordingly, any other medium may be used upon which changes in logical state (i.e., logical transitions) may be spaced apart to form a spatial array, such as optical medium print medium, etc. Furthermore, it should be understood that references to a magnetic stripe include stripes fixed to any substrate, such as a plastic card, "chip" card, or object of any physical dimensions and materials which would allow a reader to pass over the stripe and which would support the stripe without disturbing the magnetic field.

Magnetic particles (not shown) of the magnetic stripe 101 are magnetized to dipoles with north and south poles indicated by the letters "S" and "N". Lines of flux 102 are generated by, and circulate about, the dipoles allowing a magnetic reader to detect the transitions in the polarity of the dipoles by detecting the resulting flux transitions. In the context of a magnetic medium, flux transitions correspond to logical transitions. That is, each time the polarity of a dipole under the read head changes, the reader detects that change as a change from one logical state to another logical state. This is illustrated by the square wave signal 105 shown in FIG. 1. Waveform 105 illustrates the output from a typical magnetic read apparatus. Each time the read apparatus encounters a flux transition current through the coil 209,211 (see FIG,. 2) of the read apparatus 200 transitions through zero. Each coil 209, 211 is coupled to a current amplifier 402 and a zero crossing detector 420 (see FIG. 4). The output from the zero crossing detector 420 produced at the read apparatus is shown by the waveform 105. The particular relationship between the current and the density of the flux lines depends upon the relative direction in which the windings of the read apparatus are wound and the connections to the read apparatus. Those skilled in the art will be familiar with such read apparatus. Accordingly, by detecting the zero crossing, a corresponding transition 111 in the logic state of the square wave signal 105 is produced, indicating the direction of the flux lines (and the polarity of the dipole under the read apparatus). By detecting the point at which the current is zero, the point at which the flux transition occurs can be very accurately detected.

In accordance with the Manchester code, the length along which the data is to be written is divided into a plurality of bit cells of equal length 2T. Bit cells are defined by two transitions, one at the beginning of each bit cell and one at the end. Since the end of one bit cell and beginning of the next adjacent bit cell are coincident, the same transition defines the end of a first bit cell and also defines the beginning of a second bit cell. These transitions are referred to as logical clock transitions, since they occur at regular intervals. In addition, transitions may occur midway between the beginning and end of each bit cell. These transitions are referred to as logical data transitions. Logical data transitions represent a data bit in a first logical state (such as a logical one). Alternatively, if no transition occurs midway between the beginning and end of a bit cell, then the bit cell represents a data bit in a second logical state (such as a logical zero). For the purpose of simplicity and ease of explanation, bit cells having a transition midway between the beginning and end are considered to be logical ones, and bit cells which do not have such a transition are considered to be logical zeros. However, it should be clear that in an alternative embodiment this relationship may be reversed.

Each such transition should occur at a precise location, as defined by the size of a bit cell. However, errors in the placement of the transitions can occur due to any one or more of the following reasons related to the magnetic stripe: (1) poor milling or dispersion of the oxide used in the medium; (2) poor magnetic particle alignment; (3) poor switching field distribution; (4) variations in coercivity in components of the pigment; (5) poor signal remnants; (6) variations in surface roughness of the medium; (7) dirt on the surface of the medium; (8) previous magnetic history; and (9) stripe profile.

In addition. transitions may be out of position for one or more of the following reasons related to fixing a magnetic stripe on a plastic card: (1) variations in the dimensions of the card; (2) card edge roughness; (3) card warpage; and (4) card surface roughness.

Still further, the following factors related to the encoder can contribute to error in the placement of transitions: (1) variations in the transport velocity; (2) write head hysteresis; (3) write current set too high/low; (4) write current rise time too slow; (5) write head pressure too low; (6) variations in spacing between write head and stripe; (7) misalignment of write head; (8) write head dirty or worn; (9) write head bounce; and (10) pulse crowding.

Due to deviations between the actual placement of transitions and the ideal location at which such transitions should occur (i.e.. "jitter"), a "range of spatial uncertainty" is defined about the ideal location at which each transition should occur. Because most of the variables that cause jitter are due to random events which are not repeatable and which are beyond the control of the system which stores information on a document, the pattern of jitter which results is unique to each write operation. That is, each time information is stored on a document, the exact placement of each of the transitions will form a unique "signature" which may be detected, documented, and used later to authenticate that information and the document on which the information is carried.

Apparatus of the Preferred Embodiment of the Invention

Figure 2:
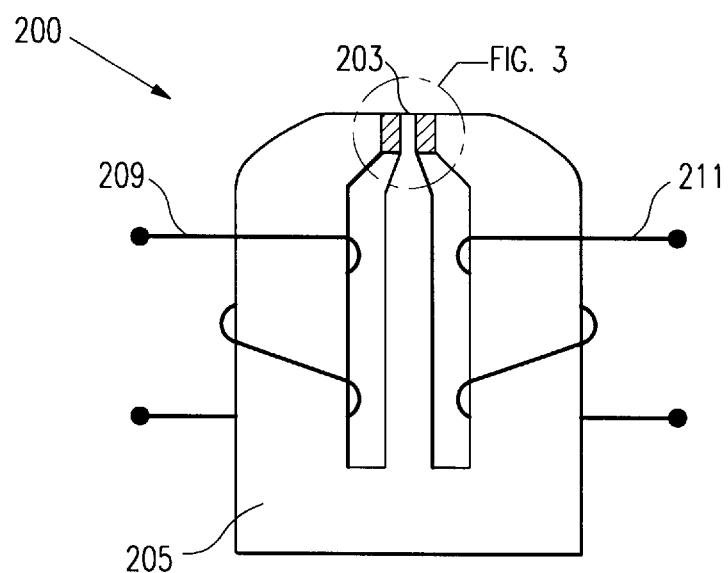
FIG. 2 is an illustration of a magnetic read head in accordance with one embodiment of the present invention.
Figure 3:
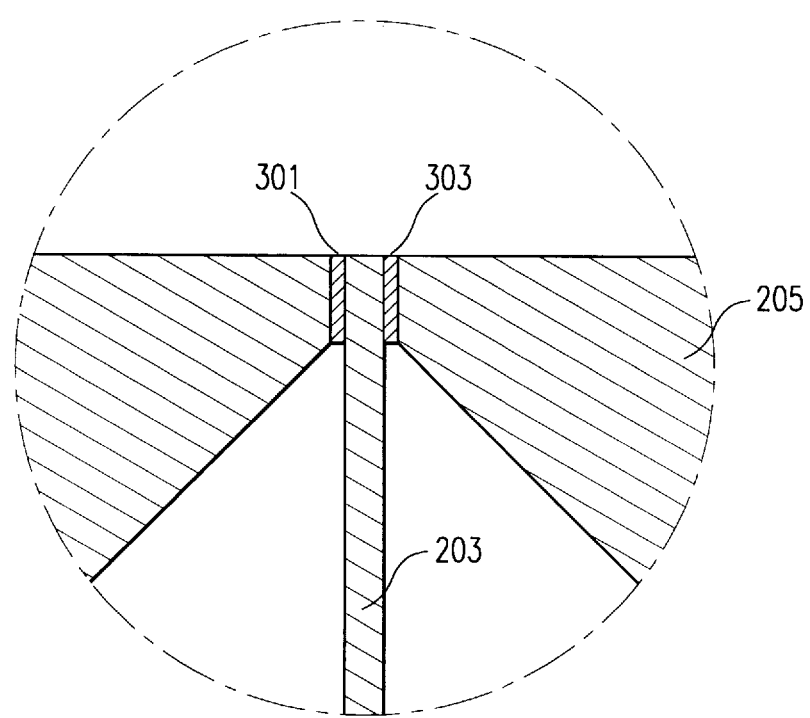
FIG. 3 is a detailed illustration of the read gaps of the read head of FIG. 2.

The following is a description of the hardware used in accordance with the present invention. A description of the operation of the invention follows. A reader having leading and trailing read apparatus is used to read information from two locations spaced apart on a document. The leading read apparatus reads the information first, and a time later, the trailing read apparatus reads the same information. In accordance with one embodiment of the invention, the reader is a magnetic read head having at least two read gaps. FIG. 2 is an illustration of a magnetic read head 200 in accordance with one embodiment of the invention. FIG. 3 is a detailed illustration of the read gaps 301, 303 of the read head of FIG. 2. Preferably, the center to center spacing between the first and second read gaps 301. 303 is an odd multiple of one half the ideal length of a bit cell. For example, on a magnetic stripe on which data is written at 210 bits/inch, one half the ideal length of a bit cell is 0.0023 inches. For data written at 75 bits/inch, one half the ideal length of a bit cell is 0.0067. A center core 203 separates the first and second read gaps 301, 303. A C-core 205 provides a path of low magnetic resistance for lines of flux to direct the magnetic field through a first coil 209 and a second coil 211. Methods for fabricating such inductive magnetic read heads arc well known.

In accordance with an alternative embodiment of the present invention, the reader is a magnetic read head which is fabricated using thin film techniques. The read head may be either a magnetoresistive head (MR), an inductive head, or a head having some combination of these two types. The basic techniques for fabricating thin film inductive and MR read heads are well known. For Example, such basic techniques are described in "An integrated Magnetoresistive read, Inductive write High Density Recording Head", C. H. Bajorek, S. Krongelb, L. T. Romankiw and D. A. Thompson, 20th Annual AIP Conference Procedure, No. 24, pp. 548–549 (1974), describes a process for fabricating acombination head having an MR read head and an inductive write head. Such conventional thin film techniques can be used to fabricate a magnetic read head which has two or more read heads in accordance with the present invention. These read heads may be either inductive, MR, or a combination of both inductive and MR. By using a thin film technique, the distances between the read gaps of each read apparatus can be as little as a few thousandths of a an inch. Alternatively, a substrate, such as a silicon substrate, can be micromachined to fabricate a plurality of read heads in close proximity to one another. In one embodiment. electronic circuit, such as the current amplifier 402, zero cross detector 420, and processing device can be fabricated on the same substrate using well known integrated circuit fabrication techniques.

Figure 4:
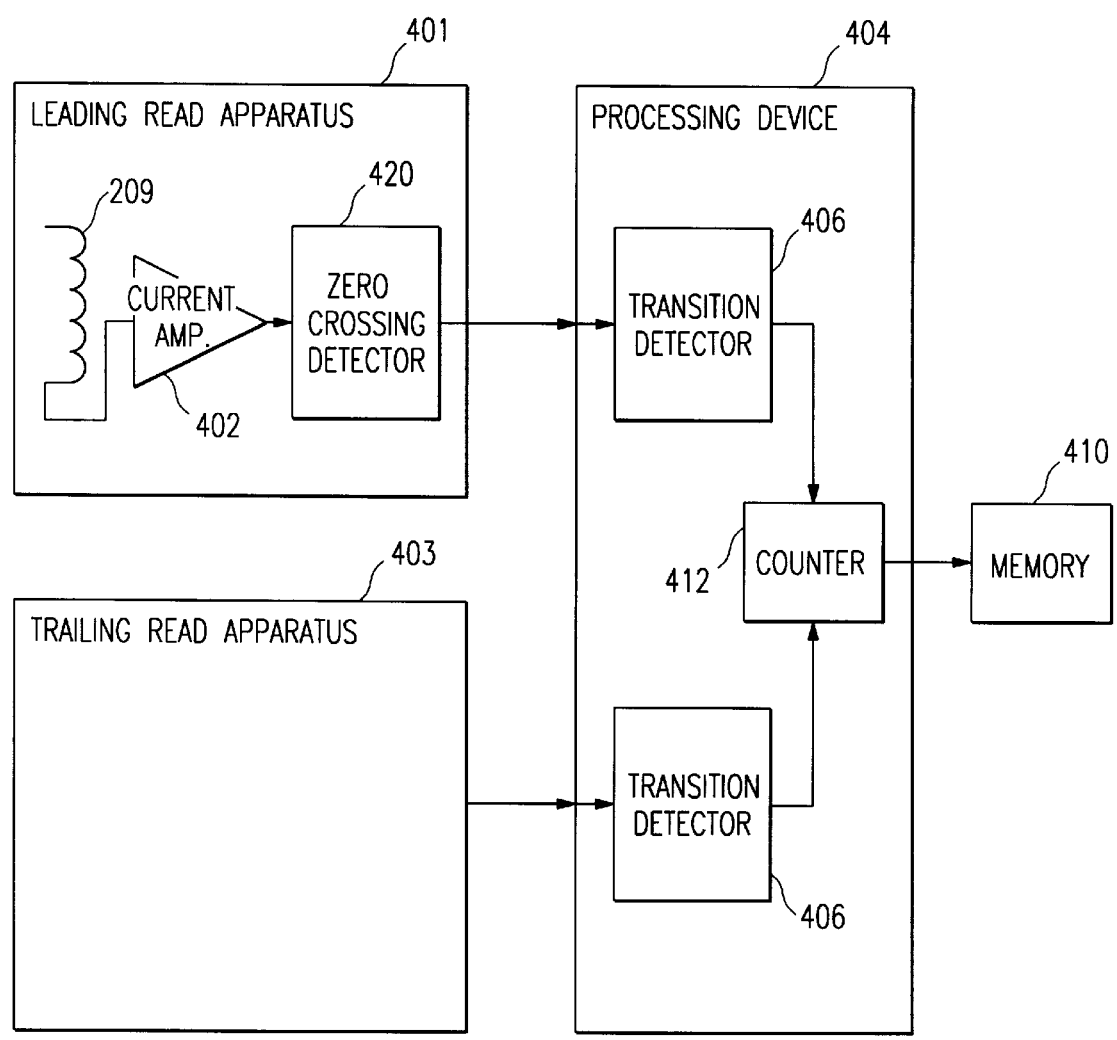
FIG. 4 is a functional block diagram of the preferred embodiment of the present invention.

FIG. 4 is a functional block diagram of the preferred embodiment of this invention. A leading and trailing read apparatus 401, 403 include all the necessary "front end" electronics to provide a square wave output, such as the square wave waveform 105 shown in FIG. 1. That is, as is well known in the art, the read apparatus 401, 403 includes amplifiers, integrators, comparators, etc.. required to produce a square wave output. The details of only the leading read apparatus are shown. However, it will be understood that the leading and trailing read apparatus 401,403 are preferably identical. In the preferred embodiment, as shown in FIG. 4, the front end electronics includes a current amplifier 402 coupled to the coils 209, 211. The output from the current amplifier is coupled to a zero crossing detector 420. Such a circuit has been observed to provide better performance than have circuits which rely upon detecting voltage levels by more precisely detecting the point in time when the lines of flux transition. Accordingly, the use of a current amplifier and zero crossing detector allows the transition to be detected very accurately after the lines of flux change direction. The square wave outputs from each read apparatus 401. 403 are coupled to a processing device 404, such as a programmable microprocessor, an application specific integrated circuit (ASIC), or a state machine.

The following description assumes that the processing device 404 is a microprocessor. However, it will be clear to those skilled in the art that many other embodiments of the processing device 404 can function similarly. Initially, the processing device 404 performs a transition detection function 406. Circuits internal to the processor generate an interrupt upon detection of a change in the input level of the incoming signal. Alternatively, transitions are detected by checking the logical state of the incoming signal at relatively short regular intervals. For example, in one embodiment an interrupt clock causes other functions to be interrupted in order to check the logical state of the incoming signal. Techniques for generating interrupts upon a logical transition of an incoming signal are well Known in the art. In yet another alternative embodiment, the transition detection function may be performed by an external device. The processing device 404 of the preferred embodiment includes a counter function 412. The processing device is capable of starting the counter in response to a first event and stopping the counter (or noting the value of the counter) in response to a second event. The processing device 404 is coupled to a memory device 410 to which the processing device 404 transmits the elapsed count value representing the distance between logical transitions on each of the signals output from the read apparatus 401, 403. The memory device 410 may be configured as a first-in-first-out (FIFO) buffer device, a randomly accessible addressable memory, or any other suitable memory configuration. In one embodiment of the present invention, the distances measured between the leading and trailing read apparatus 401, 403 detecting the same transition (i.e., the "Reference Values") are stored in a "Reference FIFO", and the values measured between the leading read apparatus 401 detecting two adjacent transitions (i.e.. the "Jitter Values") are stored in a "Jitter FIFO".

A half bit cell clock is generated by logically ORing the outputs from the transition detectors, such that if a transition is detected at either the leading or trailing read apparatus, then a pulse occurs in the half bit cell clock. Alternatively, detection of a transition at either read apparatus causes a transition on the half bit cell clock from a first logical state to a second logical state, such that the half bit cell clock is a square wave output having a frequency that is equal to the rate at which the beginning of bit cells are detected by one read apparatus. Sincc the leading and trailing read apparatus are spaced apart by an odd multiple of one half of a bit cell, a transition of the half bit cell clock will occur every half bit cell, as the name implies.

In accordance with one embodiment of the invention, each half bit cell is uniquely associated with a "Half Bit Cell Count" (HBCC). A counter starts counting at a reference bit cell (i.e., a bit cell that is uniquely identified, such as by a Start Sentinel or other bit pattern in the data) and increments each subsequent half bit cell to generate the series of unique HBCCs. Each half bit cell is uniquely associated with the HBCC generated at the time that half bit cell was being read by the leading read apparatus, or alternatively, read by the trailing read apparatus. The Reference Values and the Jitter Values stored in the two FIFOs are associated with the HBCC present in the counter when the Values are stored. Thus, each Jitter Value and Reference Value stored in each FIFO is associated with a location on the medium. The Jitter Values and Reference Values can then be remeasured at another time to verify that the amount of jitter has not changed, and thus that both the data and the medium have not changed since the last time the Jitter Values were generated. Since the measurements will depend upon the velocity of the medium with respect to the read apparatus, both the Reference Value and the Jitter Value must be known in order to determine the absolute deviation from the ideal location for each transition. However, by storing a value equal to the Jitter Value divided by the Reference Value, the absolute deviation is known from one value. Accordingly, in an alternative embodiment of the invention, only a single Ratio FIFO is provided for storing the quotient of the Jitter Value divided by the Reference Value (i.e., the "Jitter Ratio"). Measurements of the Jitter Value and the Reference Value allow a secure signature to be generated that is unique to the data that was written on that particular medium at the particular time, since a particular jitter pattern cannot be reproduced, even if the same data pattern is rewritten on the same medium.

Figure 5:
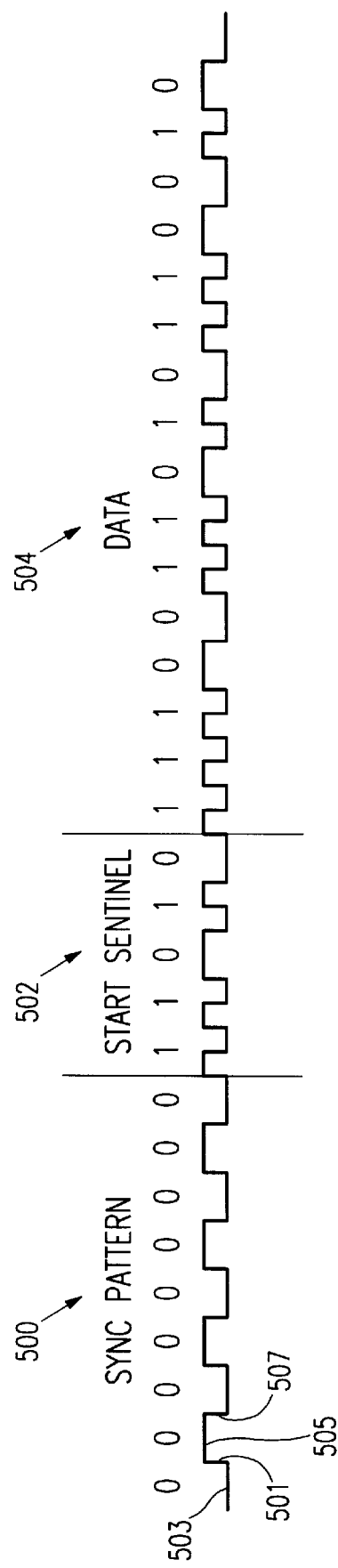
FIG. 5 is an illustration of a transition pattern in accordance with ISO 7811/2.

FIG. 5 is an illustration of a pattern in accordance with ISO 7811/2-Magnetic Stripe. The first portion of FIG. 5 is a synchronization pattern 500. The synchronization pattern allows readers to synchronize to the beginning and end of bit cells which follow. The synchronization pattern 500 is all zeros, as noted above each cell in the pattern. Next is a "Start Sentinel" 502, which indicates that the data portion is about to begin. In the present example, the Start Sentinel 502 is a pattern of "11010". The start sentinel shown complies with ISO 7811/2-Magnetic Stripe for either track 2 or 3. The least significant bit (i.e., left most bit) is written first. The last bit of the pattern is a parity bit (shown as a zero in the example). The data 504 follows the Start Sentinel 502. While the spacing between the leading and trailing read apparatus may be any odd multiple of one half the bit cell length, in the preferred embodiment of the present invention, the leading read apparatus and trailing read apparatus are spaced apart one half bit cell. This spacing is preferred in order to maximize the amount of the data pattern which can be read. That is, the greater the spacing between the read apparatus, the further into the information the leading read apparatus will be before the trailing read apparatus starts to detect useful information and the further from the end the trailing read apparatus will be when the leading read apparatus stops detecting useful information. However, it will be understood by those skilled in the art that the ability to bring the leading and trailing read apparatus close together will depend upon the type of read apparatus used. For example, in magnetic read heads, the distance between two read gaps will depend upon the ability to isolate the read gaps in order to prevent lines of flux being read across one read gap from being distorted by the proximity of the other gap.

Operation of The Preferred Embodiment of The Invention

Figure 6A:
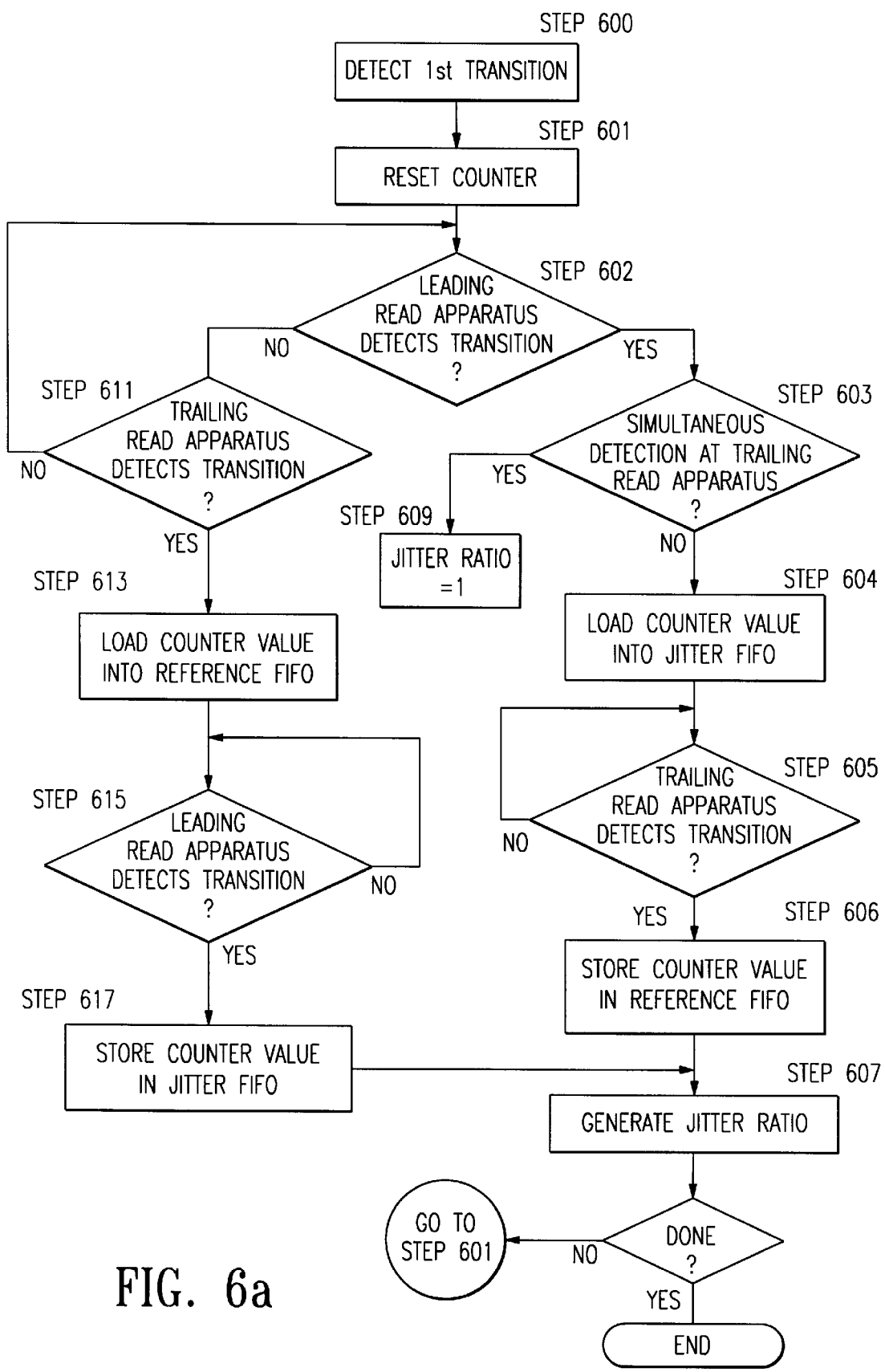
FIG. 6a is a flowchart which illustrates the procedural steps of the preferred embodiment of the invention.

FIG. 6a is a flowchart which illustrates the steps of the preferred embodiment of the present invention. In accordance with the preferred embodiment of the invention, when the leading read apparatus 401 detects the first transition 501 from a first logical state 503 to a second logical state 505 (STEP 600), the counter 412 is preferably reset to zero. Alternatively, the counter 412 may be set to any predetermined reference value. Immediately, the counter 412 starts counting at a rate that is substantially greater than the rate at which each bit cell will be traversed (STEP 601). If the leading read apparatus 401 detects the second transition 507 first (STEP 602), then a determination is made as to whether the trailing read apparatus 403 simultaneously detected the first transition (STEP 603 ). If not, then the value of the counter 412 is loaded into the Jitter FIFO (STEP 604). It should be clear that this only occurs when the distance between the first and second transition 501, 507 is less than one half of a bit cell, since the trailing read apparatus 403 will detect the first transition after the medium has moved exactly one half of a bit cell with respect to the read apparatus. Accordingly, this will not occur when the read head is reading a bit cell that represents a zero, as is the case in each bit cell of the synchronization pattern 500.

When the trailing read apparatus 403 detects the first transition 501 (STEP 605), the value of the counter 412 is read and stored in the Reference FIFO (STEP 606). This value is the Reference Value (i.e., a value representing the exact between the leading read apparatus 401 and the trailing read apparatus 403). In the present example, the Reference Value represents exactly one half bit cell.

In accordance with one embodiment of the invention, the processing of the Reference Value and the Jitter Value is performed after all of the data has been read. Accordingly, the process continues at STEP 601. Alternatively, the Reference Value and the Jitter Value are immediately read from the respective FIFOs and processed. The Jitter Value is divided by the Reference Value to generate a "Jitter Ratio" (STEP 607). The Jitter Ratio represents the amount of jitter in the location of the second transition 507 (i.e., the distance between the first and second transitions 501, 507 with respect to one half bit cell). If the Jitter Ratio is either greater than 1.0, but less than 1.5, or greater than 2.0, but less than 2.5, then the jitter is positive (i.e., the distance between the first and second transitions is too long). However, if the Jitter Ratio is greater than 1.5, but less than 2.0, then the jitter is negative (i.e., the distance between the first and second transitions is too short). If the Jitter Ratio is greater than 2.5, then the transition is an error. In one embodiment of the invention, the Jitter Ratio is stored together with the associated HBCC. Attentively, the Jitter Ratio is multiplied by the distance between the leading and trailing read apparatus to determine the absolute distance between the first and second transitions. For example if the Jitter Ratio is equal to 1.1 and the distance between the leading and trailing, read apparatus is 0.0024 inches, then the absolute distance between the first and second transitions is equal to 0.00264 inches. The accuracy of this measurement depends on the accuracy with which the distance between the leading and trailing read apparatus can be known and the speed of the clock used to increment the counter which determines the Jitter Value and the Reference Value. In addition, instantaneous unpredictable speed variations (i.e., high acceleration rate) during the measurement will affect the accuracy. However, such instantaneous speed variations will be slight due to the mass and inertia of the moving components and the short periods of time during which values are being measured. If processed immediately, the absolute distance is stored in association with the HBCC in order to associated each distance measured with a particular pair of transitions. Accordingly, the present invention is essentially unaffected by variations in speed which occur at rates of acceleration which are common in systems used to move a medium past a read apparatus, such as systems in which a magnetic stripe is transported across a read head by a manual card swipe.

If the leading read apparatus 401 and the trailing read apparatus 403 detect the second and the first transitions 501, 507 simultaneously (STEP 603), then there was no jitter in the location of the second transition 507 (i.e., the distance between the first and second transitions is exactly one half of a bit cell). Accordingly, the Jitter Ratio is equal to 1 (STEP 609), and the absolute distance between the first and second transitions is equal to the distance between the first and second read apparatus. This only occurs when the bit cell being read represents a one, as is the case in the first bit cell of the Start Sentinel 502, or when more than 2 read apparatus are spaced one half a bit cell apart.

If the trailing read apparatus 403 detects the first transition 501 before the leading read apparatus 401 detects the second transition (STEP 61 1), then the value of the counter 412 is stored in the Reference FIFO as the Reference Value (STEP 613). When the leading read apparatus 401 detects the second transition (STEP 615), the value of the counter 412 is stored in the Jitter FIFO (STEP 617). If the Reference Value and the Jitter Value are to be processed immediately, then the Jitter Ratio is calculated (STEP 607). Otherwise, the process returns to STEP 601. and detection of the next transition is awaited. This process continues until all of the data on the medium has been read.

In accordance with an alternative embodiment of the present invention in which the Jitter Ratio is calculated immediately, the Jitter Value is stored in a Jitter Register, rather than a Jitter FIFO. Iikewise, the Reference Value is stored in a Reference Register, rather than a Reference FIFO.

It can be seen from the above description of the present invention, that the amount of jitter and the absolute distance between any two transitions of data stored in accordance with a Manchester type code can be determined accurately and either output or stored for analysis at a later time. This information can be used for a number of purposes. For example, the information regarding the amount of jitter present can be used to verify that the jitter conforms to a particular jitter standard.

Alternatively, the measurement of the amount of jitter can be used to correct errors in the placement of particular transitions. For example, if it can be determined that a particular distance between a first and second transitions is too short, and the distance measured between the second transition and a third transition is too long, and further that the sum of these distances is approximately equal to the sum of the correct values for these distances, then the determination can be made that the second transition was written too close to the first transition. Accordingly, information that would otherwise not have been intelligible can be read. Furthermore, if a write head follows the read apparatus then the write apparatus could be used to correct the error in the placement of the second transition. Accordingly, by combining use of conventional parity error checking, longitudinal redundancy checking and jitter error correction, the present invention provides a very robust error detection and correction system. It should be understood that error detection and correction can be done using the present invention without rewriting the erroneous transition. However, the present invention further provides a means by which the error can be corrected on the medium so that future attempts to read the information do not detect the error, even in the absence of error detection and correction capabilities.

In accordance with another alternative, the present invention can be used to authenticate both a document and the data written thereon. In accordance with one embodiment of the invention, the data is analyzed to detect extraordinary events, such as large variations in the jitter. These events can then be used to generate a unique "Jitter Signature". That is, a Jitter Signature can be generated by selecting particular values from the jitter FIFO and encoding those values together with the HBCC associated with each value. In accordance with one embodiment of the invention, the leading and trailing read apparatus are used in a head apparatus which includes a write apparatus. The write apparatus is positioned before the two read apparatus. Therefore, after the write apparatus writes information, the two read apparatus read the information that was written in order to generate a Jitter Signature. When an event is selected, that event is included in the Jitter Signature within a few cycles of the half bit cell clock. Therefore, once a sufficient number of events have been selected to generate a reliable Jitter Signature, the Jitter Signature can be encoded into the data which is about to be written. Alternatively, the Jitter Signature can be written after the data has all been written by a leading write apparatus and verified by the trailing read apparatus. In yet another alternative, the Jitter Signature is written in a second pass. Still further, the Jitter Signature can be encoded onto the medium using a second storage technique, such as by writing the information into an integrated circuit of a chip card to which the magnetic medium has been fixed or alteratively, optically storing the Jitter Signature which is generated from a magnetic stripe, or vise versa. Alternatively, the Jitter Signature may be stored in an online data base.

Figure 6B:
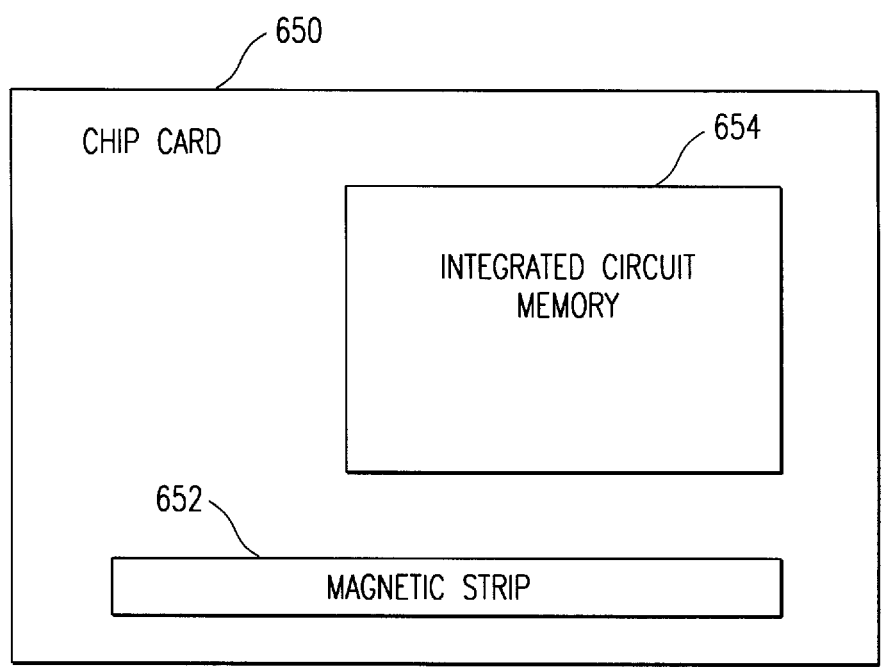
FIG. 6b is an functional block diagram of an alternative embodiment of the present invention, in which a medium is fixed to the exterior of a chip card.

FIG. 6b is an functional block diagram of an alternative embodiment of the present invention, in which a medium 652, such as a magnetic stripe, is fixed to the exterior of a chip card 650. The Jitter Signature is calculated from the medium 652 and stored in a memory device 654, such as an integrated circuit chip, within the chip card 652. In yet another embodiment of this invention, the Jitter Signature can be used to authenticate the chip card 650, and thus secure the information that is stored on the memory 654, by requiring that the Jitter Signature that is stored within the memory 654 match a Jitter Signature that is read from a medium 652. Accordingly, attempts to duplicate the chip card 650 would be detected, since the Jitter Signature can not be duplicated. The security of data in the chip card 650 can be further enhanced by encrypting the data with the "Jitter Signature" being used as an encryption key.

In accordance with one embodiment. the Jitter Signature is encoded into the data to be written by "Jitter Modulation". In general, Jitter Modulation is an encoding scheme wherein pairs of transitions stored on the medium are spaced apart by a non-integer multiple of a reference value, such as a half bit cell length. The difference between the spacing of each pair of transitions and a closest integer multiple of the reference value is used to encode information. For example, a pair of transitions may be written to a document at a spacing of 2.2 times the length of a half bit cell. The closest integer multiple of a half bit cell is 2.0. Therefore. the distance 0.2 times a half bit cell is used to encode information. Since the spacing of transitions can vary arbitrarily, it is preferable to encode a bit by using more than one such intentional deviation in the location of a transition. For example, the following pattern of transitions may represent a logical "I ": the spacing between a first and second transitions is between 1.1 and 1.3 times a half bit cell (i.e., greater than the nearest integer multiple of a half bit cell); the spacing between the second and a third transition is between 0.9 and 0.7 times a half bit cell (i.e., less than the nearest integer multiple of a half bit cell); and the spacing between the third and a fourth transitions is between 2.1 and 2.3 of a half bit cell represents a logical "1" (i.e., greater than the nearest integer multiple of a half bit cell). It can be seen that the distances between logical transitions are intentionally shortened or elongated in order to represent additional data bits. By using more than one delay or advance to represent each unit of information within the Jitter Signature, intentional jitter can be more easily distinguished from jitter which is unintentionally present in the data.

The use of Jitter Modulation allows the Jitter Signature to be encoded into the medium without disrupting the format of the medium. For example, the format used to store data on a magnetic stripe does not provide a location on the document for storing a Jitter Signature. The present invention can be used to secure such a magnetic stripe by generating a Jitter Signature from a first portion of the information encoded on the stripe, and storing the Jitter Signature encoded using Jitter Modulation in a second portion of the information. Such a security system does not require any special medium or change to the data formatting. Accordingly, the present invention allows documents stored on existing magnetic stripe cards to be secured and the information written thereon to be authenticated without disruption to the format of the information. The information on the document can be authenticated merely by reading the information and regenerating the Jitter Signature. A copy of the Jitter Signature may also be maintained within a central data base. Thus, only if the Jitter Signature was generated by an authorized user and properly recorded in the data base will the information contained in the document be authenticated and considered valid.

Apparatus of an Alternative Embodiment of The Invention

Figure 7:
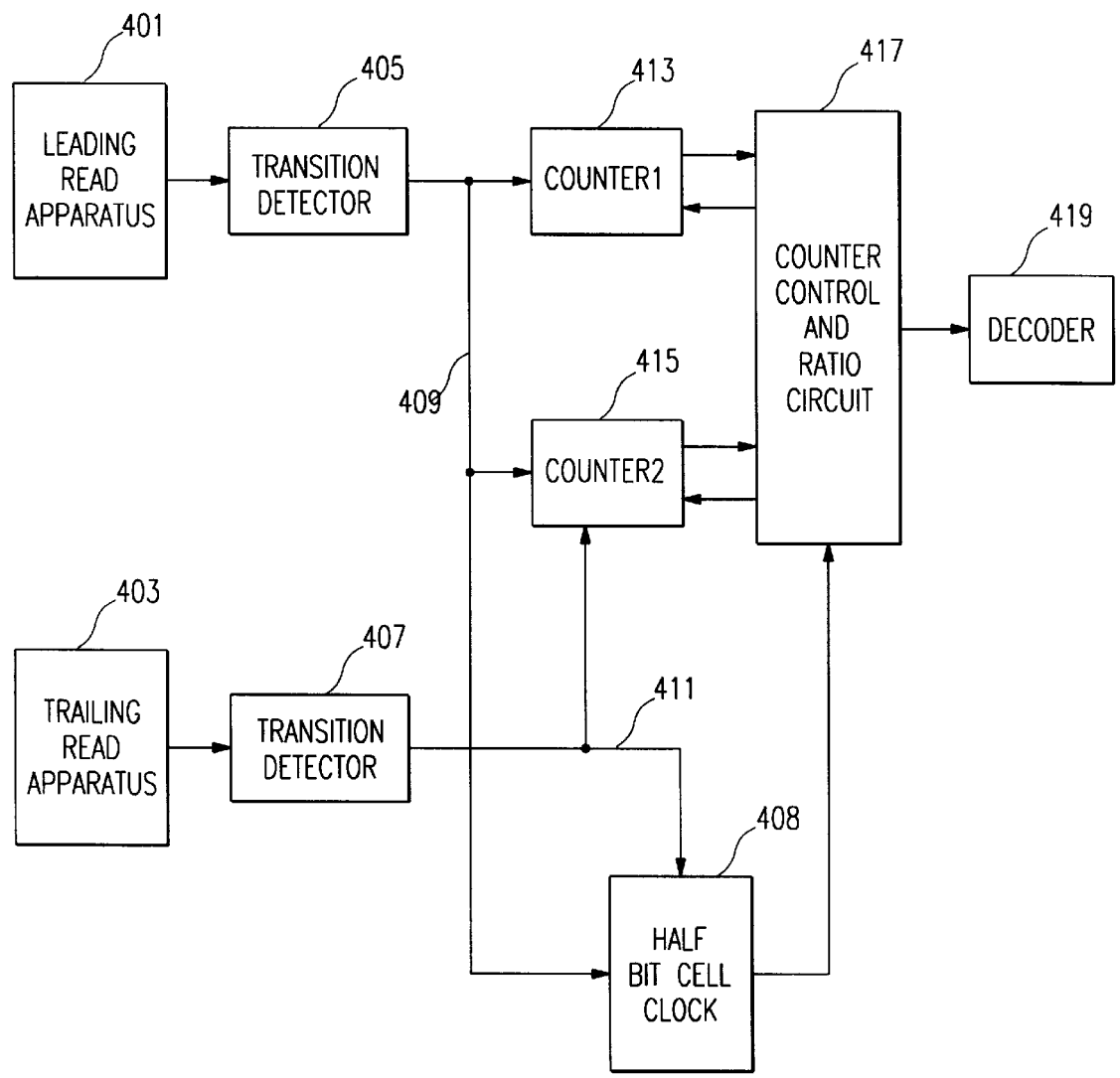
FIG. 7 is a functional block diagram of an alternative embodiment of the invention in which at least two discrete counters are used to measure the Reference Value and the jitter Value.

FIG. 7 is a functional block diagram of an alternative embodiment of the invention in which at least two discrete counters are used to measure the Reference Value and the Jitter Value. The square wave output from each read apparatus 401, 403 is coupled to an associated transition detector 405, 407, respectively. Each transition detector 405, 407 generates a pulse on a corresponding output signal line 409, 411, respectively, each time the square wave output from the associated read apparatus 401, 403 changes logical state. In accordance with one embodiment of the present invention, each transition detector comprises a two input exclusive OR-gate. The same signal is coupled to both inputs. However, the signal coupled to one of the inputs is delayed by the desired length of the pulses to be generated. One well known method for delaying a signal is to perform a double inversion. Alternatively, the transition detector includes a dual edge triggered monostable multivibrator (or "one-shot") which produces a pulse each time the output from the read apparatus 401, 403 transitions either high or low. Each output from the two one-shots is then applied to a different one of the two inputs of a two input OR-gate. In still another transition detector, the output from the read apparatus 401, 403 is applied to both a positive edge triggered one-shot and a negative edge triggered one-shot. The outputs from each one-shot are then coupled to a corresponding one of the two inputs to a two input OR-gate. It will be clear to those skilled in the art that there are numerous ways to make a transition detector which generates pulses upon a logical transition by a signal applied to the input thereof It will further be clear that the above described discrete transition detectors may be used in the preferred embodiment of the invention described previously.

The outputs of the two transition detectors 405, 407 are coupled to two corresponding inputs to a half bit cell clock generator 408 on signal lines 409 and 411, respectively. In the preferred embodiment of the invention, the half bit cell clock generator 408 is merely an OR-gate which ensures that an output pulse is generated each time either of the transition detectors 405, 407 generates an output pulse. Accordingly, the half bit cell clock is a pulse train. Alternatively, the pulse train is used to generate a square wave signal with 50% duty cycle and a frequency equal to the bit rate of the information being read by the leading and trailing read apparatus 401, 403. If such a square wave signal is generated, then the square wave signal, and not the pulse train, is referred to as the half bit cell clock.

The output from the leading transition detector 405 is also coupled to an input of a first counter ("COUNTER1") 413 and a second counter ("COUNTER2") 415 over signal line 409. If COUNTER1 413 is not currently running, then a pulse on the signal line 409 starts COUNTER1 413. However, if COUNTER1 413 is already running, then a pulse on the signal line 409 stops COUNTER1 413. A pulse on the signal line 409 starts COUNTER2 415 if the second counter is not running. The output from the trailing transition detector 407 is also coupled to a second input of COUNTER2 415 over a signal line 411. If a pulse is received by COUNTER2 415 over the signal line 411 and the second COUNTER2 415 is running, then the second counter stops.

The output of each counter 413, 415 is coupled to a counter control and ratio circuit 417. The outputs from the counters 413, 415 provide a value to the counter control and ratio circuit which is proportional to the distance covered during which the counter was running. The counter control and ratio circuit has an output coupled back to each counter 413, 415 which enables each counter r circuit to begin running upon receipt of a pulse on signal line 409 in the case of COUNTER1 413, and upon receipt of a pulse on signal line 411 in the case of COUNTER2 415. The counter control and ratio circuit 417 receives the values output from each of the two counters 413, 415 and calculates a counter control and ratio of the two values which is indicative of the absolute distance between two logical transitions detected by read apparatus 401, as will be made clear by the description of the operation of the invention provided below.

In accordance with one embodiment of the invention, the counter control and ratio circuit output is provided to an output device (not shown) or to a recording device and provides a user with an indication or listing of the absolute distances between each of the adjacent logical transitions. This output can be used to verify that the information was recorded in accordance with a particular standard. Alternatively, the output from the counter control and ratio circuit 417 is coupled to a signature circuit, such as a programmable processor, ASIC, or state machine, capable of determining which values to use to generate an authentication signature for a particular section of information which has been read by the read apparatus 401, 403. In yet another embodiment of the present invention, additional information is Jitter Modulated into the spacing of the transitions read by the read apparatus 401, 403. Therefore, the output from the counter control and ratio circuit 417 is coupled to a decoder 419 which determines whether each particular counter control and ratio or pattern of ratios is indicative of a logical one or a logical zero. In accordance with the present invention, the decoder 419 may be any processor, state machine, ASIC, or other circuit or device which is capable of decoding the ratios output from the counter control and ratio circuit to determine the logical states represented by the spacing of the logical transitions read by the read apparatus 401, 403.

Operation of The Alternative Enbodiment of The Invention

By spacing the two read apparatus 401, 403 apart by a known distance (which is preferably equal to an odd integer multiple of one half a bit cell length) a comparison can be made between: (1) Jitter Value (i.e. a first distance measured from a first transition to a second transition at the leading read apparatus 401); and (2) Reference Value (i.e., a second distance measured from the leading read apparatus 401 to the trailing read apparatus 403). It can be seen that this comparison is between: (1) the distance required to traverse a known distance along the medium (i.e., from the leading read apparatus 401 to the trailing read apparatus 403); and (2) the unknown distance along the medium (from a first transition to a next transition). Accordingly, assuming that the instantaneous rate of acceleration is within predetermined limits over the period of both measurements (such limits including the range of nearly all probable rates of acceleration):

$$\text{DISTANCE2} = (\text{JCOUNTER/RCOUNTER}) \cdot \text{DISTANCE1} \quad (\text{EQ. 1})$$

where DISTANCE 2 is the distance between the first and second transitions detected by the leading read apparatus 401; JCOUN° FER is the Jitter Value recorded by COUNTER1; RCOUNTER is the Reference Value recorded by COUNTER2; and DISTANCE1 is the distance between the leading and trailing read apparatus 401, 403. The assumption that the velocity is essentially constant is reasonable, since the inertia of the medium (or the read head) is so significant as to make rapid changes in the velocity which would significantly affect the result nearly impossible under normal operating conditions.

In accordance with an alternative embodiment of the invention, the JCOUNTER value is determined by starting the COUNTER1 413 upon detection of a transition by the leading read apparatus 401, as determined by an output from the leading transition detector 405. The identity of the transition is noted, as will be explained in more detail below. Concurrently, COUNTER2 415 starts. When the leading read apparatus 401 detects the next transition, COUNTER1 413 stops and the value JCOUNTER is coupled to the counter control and ratio circuit 417. When the transition which started the counters 413, 415 is detected by the trailing read apparatus 403, COUNTER2 415 stops and the value RCOUNTER is coupled to the counter control and ratio circuit 417. The counter control and ratio circuit preferably divides the value JCOUNTER by the value RCOUNTER and multiplies the quotient by the value DISTANCE1 to determine the DISTANCE2, the absolute distance between the transition which started the counters 413, 415 and the next transition (i.e., the transition that caused COUNTER2 415 to stop). It will be clear that the value which is output from the counter control and ratio circuit 417 may be any value which is derived from the three values JCOUNTER, RCOUNTER, and DISTANCE1 and which is proportional to the value DISTANCE2. For example, the value DISTANCE2 may be multiplied by, or summed with, a constant, or it may be inverted, or otherwise arithmetically manipulated.

In accordance with one embodiment of the invention, each transition is identified by the particular half bit cell on the medium in which the transition occurs. Each half bit cell is uniquely identified by a HBCC. That is, pulses of the half bit cell clock are counted starting at a reference half bit cell, such as the first transition stored on the medium (or, if the half bit cell clock is a square wave, then counting half cycles). While it should be clear that transitions occur within a half bit cell associated with a particular HBCC, and not within the HBCC itself, for the sake of brevity, it can be said that the transition "occurs within the HBCC". Likewise, when one of the read apparatus is within the boundaries of a particular half bit cell identified by a particular HBCC, it can be said that the read apparatus is "in the HBCC".

In one embodiment of the invention, HBCCs are generated by the counter control and ratio circuit 417. When the leading read apparatus 401 is in HBCC "47", for example, the trailing read apparatus 403 is in (or very near) a different HBCC (such as "50", assuming that the distance between the leading and trailing read apparatus 401, 403 is 1.5 bit cells). The amount of spatial deviation from the ideal location of the transitions will determine whether the trailing read apparatus 403 is near HBCC "50" or in HBCC "50". The HBCC value is preferably gated with the output from the transition detector 405, 407 corresponding with the read apparatus 401, 403 to determine exactly when a read apparatus 401, 403 enters a particular HBCC.

Figure 8A:
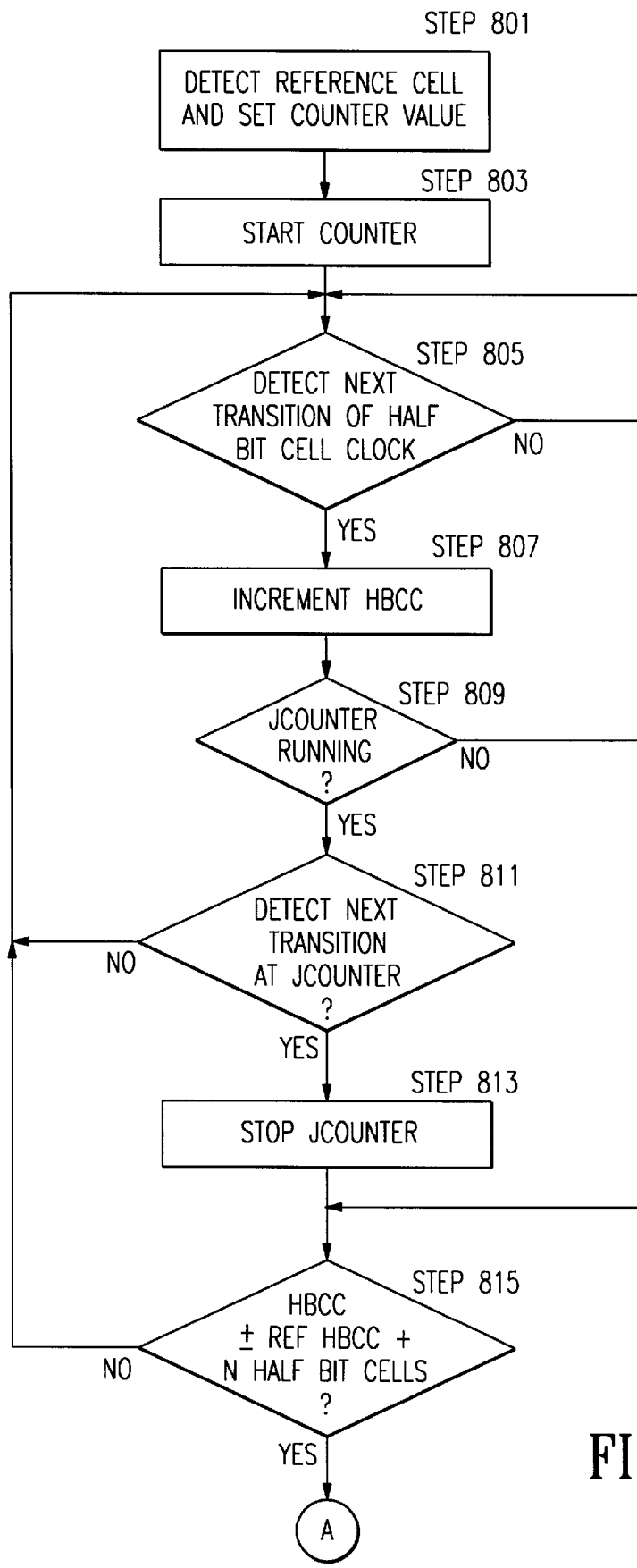
FIGS. 8a and 8b combined show a flowchart which illustrates one embodiment of the method of the present invention.
Figure 8B:
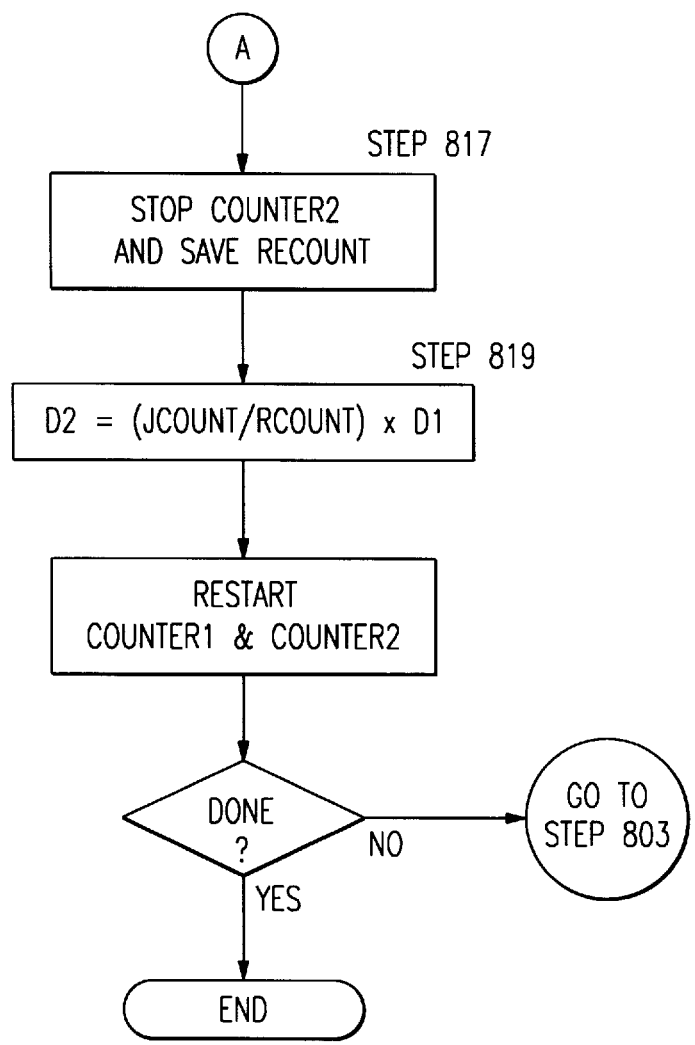

FIG. 8a and 8b is a flowchart which illustrates one embodiment of the method of the present invention. Initially, the counter control and ratio circuit 417 waits until a reference half bit cell is detected. The reference half bit cell is preferably the first half bit cell in which data can be represented. Alternatively, the reference half bit cell may be any particular half bit cell that is uniquely identified, such as by a unique pattern of transitions which make up the Start Sentinel that precedes the data. Once the reference half bit cell is detected, the HBCC associated with the reference half bit cell is saved (STEP 801). Next, COUNNTER1 and COUNTER2 are started (STEP 803). Preferably, COUNTER1 and COUNTER2 are started by a signal which is the logical AND of the HBCC and the output of the leading transition detector 405. The AND function may be performed by a discrete logic component, or by a processor, state machine, ASIC or other device. The counter control and ratio circuit 417 awaits the next pulse of the half bit cell clock, or in the case in which the half bit cell clock is a square wave signal, for the next transition from a first logic state to a second logic state of the half bit cell clock (STEP 805). When the next pulse of the half bit cell clock occurs, the HBCC is incremented (STEP 807). If COUNTER1 is running (STEP 809), then the system checks whether the next transition has been detected at the leading read apparatus 401 (e.g., a pulse at the output of the leading transition detector 405) (STEP 811). If a next transition has not been detected within a predetermined distance as determined by the next transition of the half bit cell clock, then upon detection of the next transition of the half bit cell clock (STEP 805), the HBCC is incremented (STEP 807). Once again, if the COUNTER1 is running (STEP 809), then a determination is made as to whether the next transition has been detected at the leading read apparatus 401 (STEP 811). This process should only have to be repeated once. since a transition must occur at the beginning and end of every bit cell. Thus, the leading read apparatus 401 should detect a transition at least every other transition of the half bit cell clock. Once the leading read head detects a next transition in STEP 811. COUNTER1 stops and the value JCOUNTER is saved (STEP 813). When the current HBCC becomes equal to the reference HBCC plus the number of half bit cells between the leading and trailing read apparatus 401, 403 (STEP 815), then the trailing read apparatus has detected, or is about to detect, the transition which caused COUNTER1 and COUNTER2 to start in STEP 803. Accordingly, COTUNTER2 is stopped and the value RCOUNTER is saved (STEP 817). The distance, DISTANCE 2, between the transition which causes COUNTER1 to start and the transition which causes COUNTER1 to stop can then be calculated by the equation EQ. 1 provided above (STEP 819). The distance between a next two transitions can then be measured by restarting COUNTER1 and COUNTER2 upon detection of a transition (STEP 821). The transition that causes the restarting of COUNTER1 and COUNTER2 may be the same transition which causes COUNTER1 to stop, assuming that the value JCOUNTER can be saved and the counter reset and started without significant delay. Alternatively, a second set of COUNTER1 and COUNTER2 counters can be used, such that the first set of counters is used to measure the distance between a first transition and a second adjacent transition, and the second set of counters is used to measure the distance between the second transition and a third transition. The first set of counters would then be ready for use in measuring the distance between the third transition and a fourth transition. It should be clear that by alternating between using the first and second set of counters, continuous measurements of the distance between each of the transitions can be made.

Figure 9:
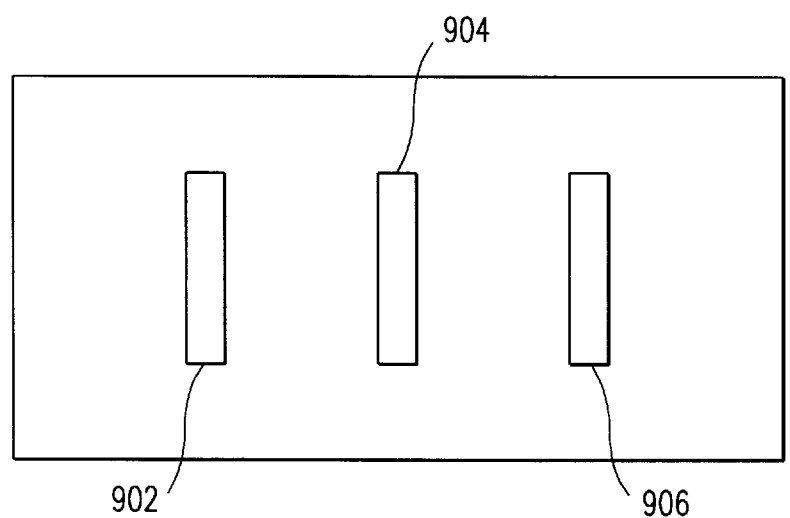
FIG. 9 is an illustration of a read head having three read apparatus in accordance with an alternative embodiment of the present invention.
Figure 10:
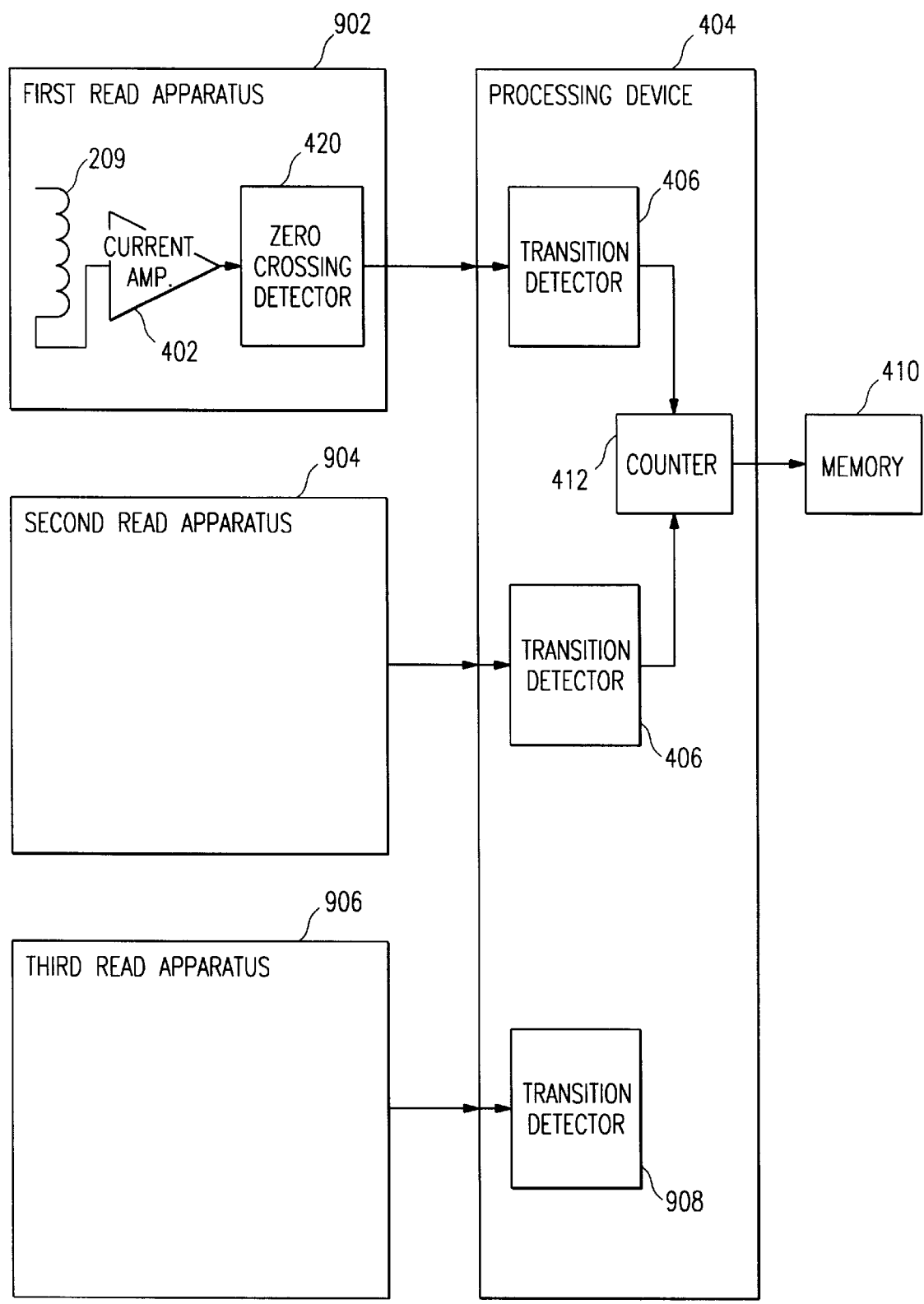
FIG. 10, is a block diagram of the three read apparatus embodiment of the present invention.

FIG. 9 is an illustration of a read head having three read apparatus in accordance with an alternative embodiment of the present invention. The first read apparatus 902 is preferably spaced one half of a bit cell from the second read apparatus 904. Similarly, the second read apparatus 904 is preferably spaced one half of a bit cell apart from the third read apparatus 906. FIG. 10, is a block diagram of the three read apparatus embodiment. A third transition detector 908 is coupled to the third read apparatus. The use of three read apparatus 902, 904, 906 allows both one bit cell and one half bit cell spacing between pairs of read apparatus. Accordingly, when transitions are spaced one bit cell apart, such as when a logical zero is encoded and no transition occurs in the middle of a bit cell, the pair of bit cells which is spaced one full bit cell apart will detect the first and second transition simultaneously if there is no jitter in the spacing. Even in the instance in which jitter is present, the distance between the first read apparatus 902 and the second transition will be less than would be the case in the above described two read apparatus embodiment. Accordingly, the three read apparatus embodiment is less susceptible to error in the measurement due to large instantaneous velocity changes which occur during the measurement.

Figure 11A:
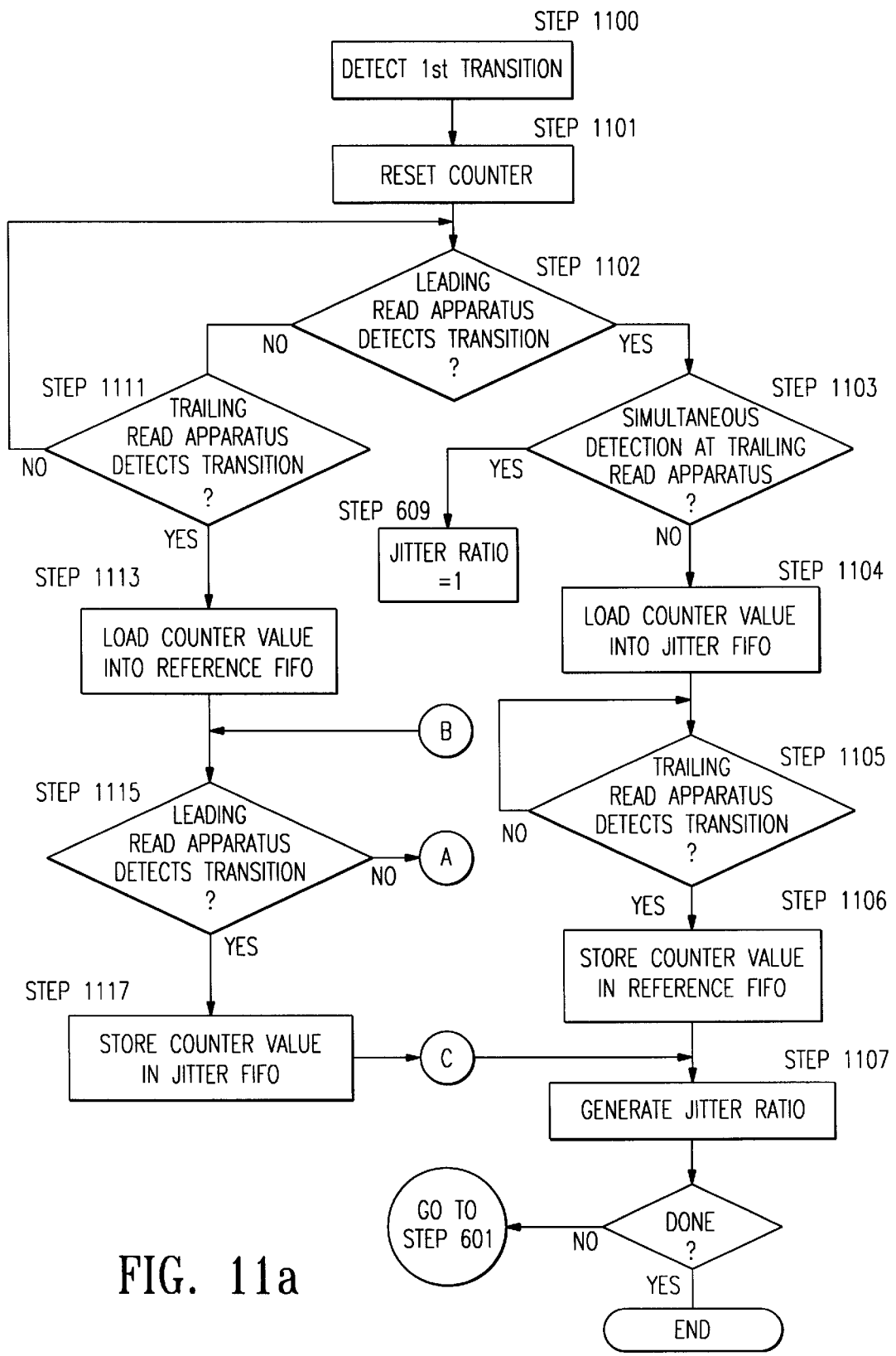
FIG. 11a–11c is a flow chart which illustrates the steps of the method of the present invention performed with a three read apparatus.
Figure 11B:
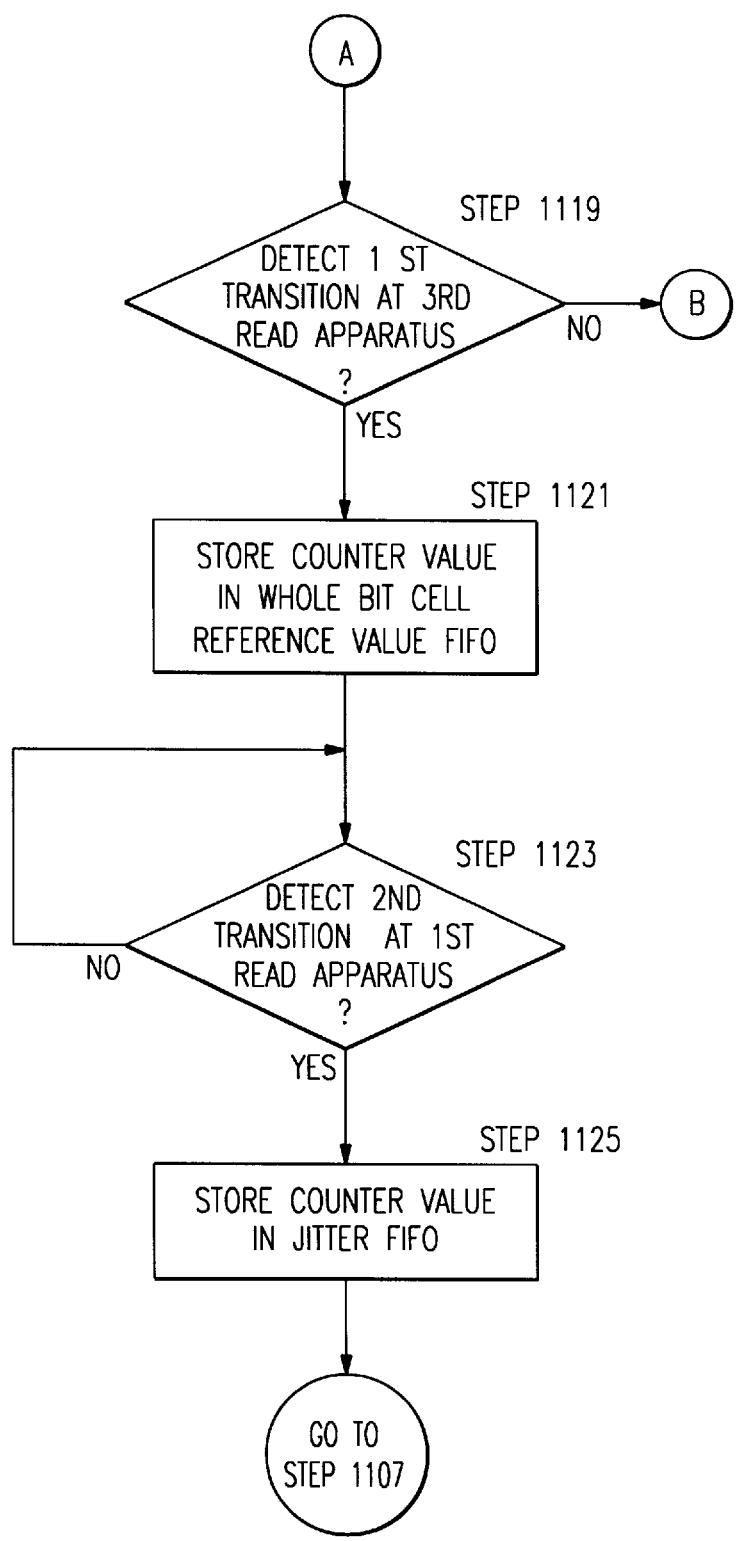
Figure 11C:
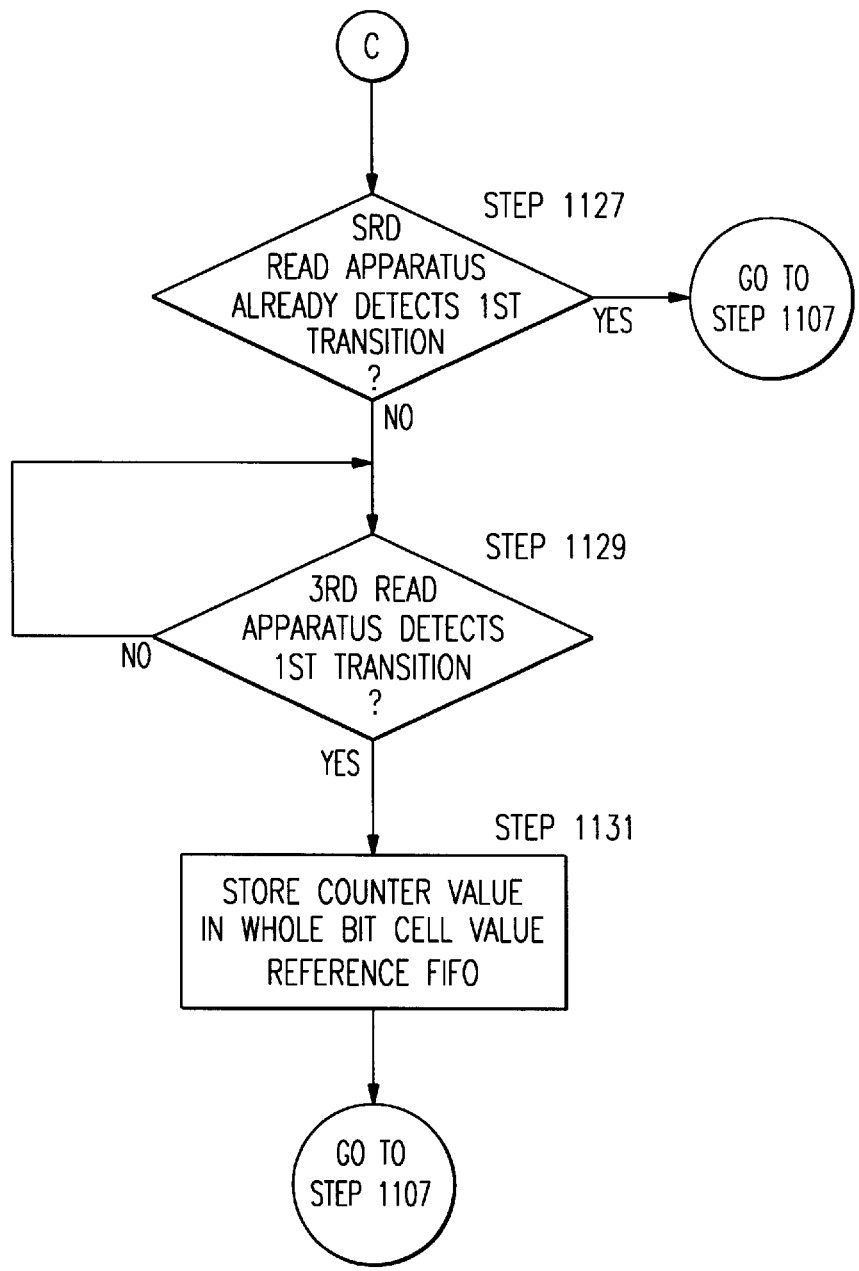

FIG. 11a–11c a flow chart which illustrates the steps of the method of the present invention performed when a three read apparatus is used. Steps 1100 through 1115 are identical to Steps 602 through 615 shown in FIG. 6. However, if the first read apparatus 902 has not detected a transition in Step 1115, then a determination must be made as to whether the third read apparatus 906 has detected a transition (STEP 1119). If not, then the process returns to Step 1115. However, if the third read apparatus 906 has detected a transition in Step 1119, then the value of the counter is stored in a whole bit cell reference value FIFO (STEP 1121). This value represents the distance of one whole bit cell. The processing device then awaits detection of a second transition at the first read apparatus 902 (STEP 1123). Once the second transition is detected, the counter value is stored in the jitter FIFO (STEP 1125). A Jitter Ratio can be calculated from the quotient of the value stored in the jitter FIFO divided by the value in the whole bit cell reference value FIFO (STEP 1107).

If the first read apparatus 902 has detected a transition in Step 1115, then the counter value is stored in the jitter FIFO (STEP 11 17). A determination is then made as to whether the third read apparatus 906 has already detected the first transition (STEP 1127). If so, then the Jitter Ratio can be calculated from either the quotient of the value stored in the Jitter FIFO divided by the value stored in the half bit cell reference value FIFO, or the quotient of the value stored in the Jitter FIFO divided by the value stored in the whole bit cell reference value FIFO, which ever is closer to 1.0 (STEP 1107). If the third read apparatus 906 has not yet detected the first transition, then the processing device waits until the first transition is detected at the third read apparatus 906 (STEP 1129). Once the third read apparatus 906 detects the first transition, the counter value is stored in the whole bit cell reference value FIFO (STEP 13131). The Jitter Ratio can be calculated from either the quotient of the value stored in the Jitter FIFO divided by the value stored in the half bit cell reference value FIFO, or the quotient of the value stored in the Jitter FIFO divided by the value stored in the whole bit cell reference value FIFO, which ever is closer to an integer value (STEP 1107). In one embodiment of the present invention, the determination as to whether the Jitter Ratio is to be calculated using the half bit cell reference value or whole bit cell reference value is made based upon whether the next transition is expected to be a logical clock transition or a logical data transition. That is, if the next transition is expected to be a logical data transition, then that next transition should occur one half of a bit cell from the last transition. According,ly, the half bit cell reference value would be used to calculate the Jitter Ratio. However, if the next transition is expected to be a logical clock transition, then the whole bit cell reference value would be used. In accordance with one embodiment of the invention, the determination as to whether the next transition is expected to be a logical data transition or a logical clock transition is made by keeping track whether each previous transition was a data transition or a clock transition. It will be clear that if the last transition was a data transition. then the next transition must be a clock transition. Furthermore, by delaying the determination for a predetermined number of transitions, the placement of transitions that occur after the questionable transition can be used to aid in the determination. For example, if the next three transitions are all spaced apart by one half a bit cell, and the following transition is spaced a whole bit cell from the third transition, then the first and third transition must be a clock transition, and the second of those three transitions must be a data transition. Going backward, the determination can be made as to whether the questionable transition is a data or clock transition. Furthermore, if the distance between a first and second transition is less than expected, and the distance between the second and a third transition is greater than expected, then the assumption may be made that the second transition has been shifted toward the first transition.

Figure 12:
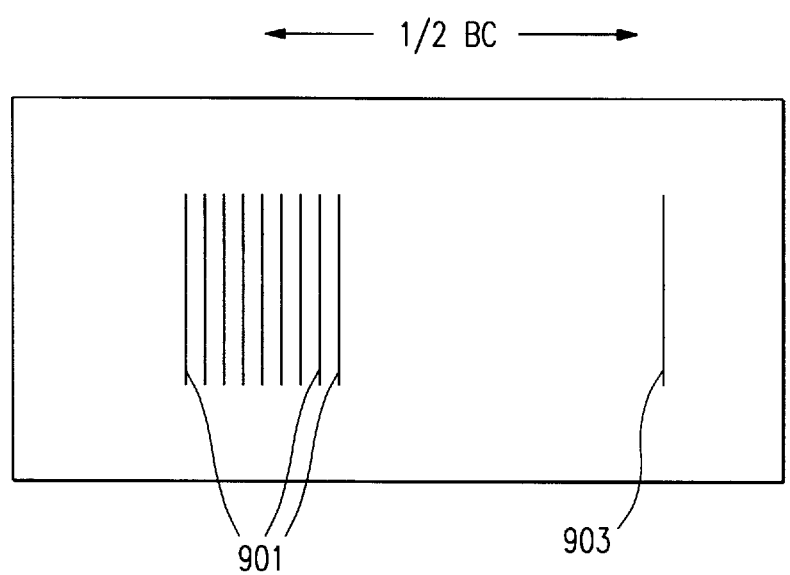
FIG. 12 is an illustration of a read head having a plurality of measurement read apparatus and a measurement read apparatus in accordance with another embodiment of the present invention.
Figure 13:
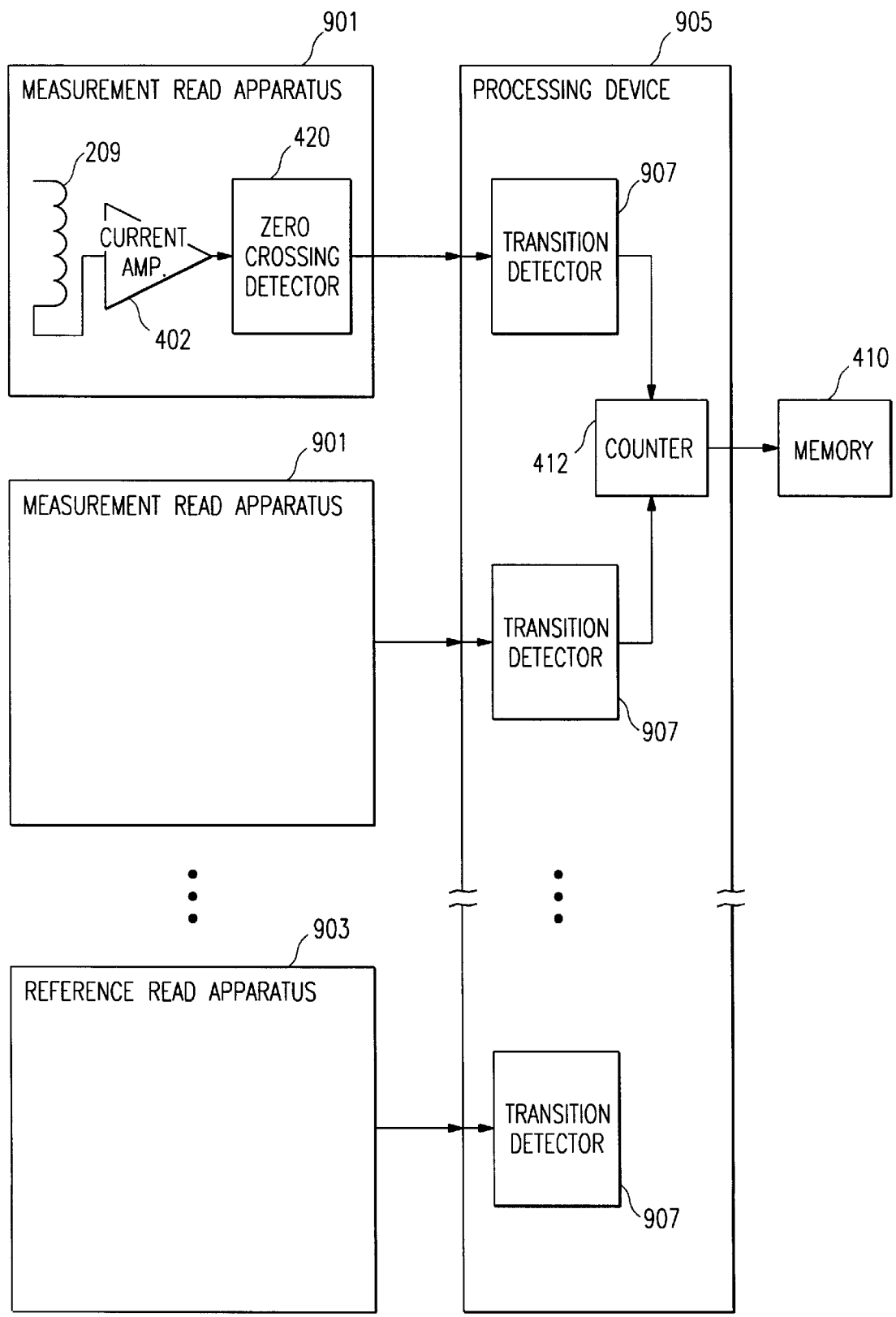
Fig. 13 is a functional block diagram of one embodiment of the present invention having a plurality of relatively closely spaced measurement read apparatus.

FIG. 12 is an illustration of a read head in accordance with another embodiment of this invention. A plurality of relatively closely spaced "measurement" read apparatus 901 are be provided in a first grouping, preferably centered one half of a bit cell from a reference read apparatus 903. FIG. 13 is a functional block diagram of the invention having a plurality of relatively closely spaced measurement read apparatus. Each read apparatus is coupled to a processing device 905. Each read apparatus is preferably similar to the read apparatus 401, described above. The processing device 905 includes a plurality of transition detectors 907 equal in number to the number of read apparatus (only three are shown). each of which corresponds one to one with an associated one of the read apparatus 901, 903. When a transition is detected at the reference read apparatus 903, the processing device 905 notes which measurement read apparatus 901 from within the first grouping detects a next transition (or alternatively, which detected the last transition). The spacing between the reference read 903 apparatus and each of the plurality of measurement read apparatus 901 within the grouping is known. Therefore, assuming that the second transition is within the grouping of measurement read apparatus 901 when the first transition is detected, the exact distance between the first and second transition can be determined to an accuracy equal to the distance between measurement read apparatus 901.

In an alternative embodiment, the processing device 905 uses information from both the measurement read apparatus 901 which detects the second transition before the reference read apparatus 903, and the measurement read apparatus 901 that detects the second transition after the reference read apparatus 903. By determining whether the second transition was closer to the measurement read apparatus 901 that detected the next transition or to the measurement read apparatus 901 that detected the last transition when the first transition was detected at the reference read apparatus 903, the accuracy of the measurement can be improved to one half the distance between each measurement read apparatus 901.

Since this measurement is based solely on the distances between the reference read apparatus 903 and each measurement read apparatus 901, the measurement is independent of the velocity and acceleration of the medium with respect to the read apparatus. It will be understood that the greater the number of measurement read apparatus 901. the greater the accuracy over a particular range of distances. For example, if two hundred measurement read apparatus 901 are provided at equally spaced distances of $1/100$th of a bit cell, starting $1/100$th of a bit from the reference read apparatus, then the distance between each pair of transitions can be known to $1/100$th of a bit cell accuracy, even if the distance between transitions are very close or as far apart as two bit cells (i.e., a substantial amount of error). Using thin film fabrication or micro-machined silicon techniques, it is feasible to economically fabricate such a read head.

Summary

A number of embodiments of the present invention have been described. Nevertheless, it will be understood that various modifications may be made without departing from the spirit and scope of the invention. For example, the half bit cell clock may be generated in any manner which results in a transition occurring each half bit cell. Furthermore, the processing functions can be divided and performed by a number of different processing devices. Still further, the number of read apparatus that are used may be any number greater than one. Accordingly, it is to be understood that the invention is not to be limited by the specific illustrated embodiments, but only by the scope of the appended claims.

What is claimed is:

1. A method for determining the distance between a first point and a second point on a storage medium, the first and second points being detectable by a leading and trailing read apparatus as the first and second points move past the leading and trailing read apparatus, the leading and trailing read apparatus being spaced apart a known distance, the method comprising the steps of:

(a) detecting the first point as the first point moves past the leading read apparatus;

(b) detecting the second point as the second point moves past the leading read apparatus;

(c) detecting the first point as the first point moves past the trailing read apparatus;

(d) measuring a jitter Value starting from the detection of the first point at the leading read apparatus and ending upon detection of the second point at the leading read apparatus; and (e) measuring, a Reference Value starting from the detection of the first point at the leading read apparatus and ending upon detection of the first point at the trailing read apparatus.

2. The method of claim 1, further including the step of storing the Jitter Value and the Reference Value associated with the pair of first and second points, and wherein each of the steps is repeated for each of a plurality of pairs of first and second points stored on the medium, such that a Jitter Value and a Reference Value are measured and stored in association with each pair of first and second points.

3. The method of claim 2, further including the step of calculating from each Jitter Value and a Reference Value, for each pair of first and second points stored on the medium, a Jitter Ratio. Ratio by the distance between the leading and trailing read apparatus to determine the distance between each pair of first and second points.

4. The method of claim 3, further including the step of generating a Jitter Signature from the Jitter Ratios.

5. The method of claim 4, further including the step of Jitter Modulating the Jitter Signature.

6. The method of claim 4, further including the step of storing new points on the storage medium by spacing pairs of adjacent new points at a non-integer multiple of a predetermined reference distance, wherein a difference between the spacing of each pair of adjacent points and a closest integer multiple of the predetermined distance representing the Jitter Signature.

7. The method of claim 6, wherein a plurality of said differences between said spacing of a plurality of pairs of said adjacent points and said closest integer multiple represent one unit of information within the Jitter Signature.

8. The method of claim 3, further including the step of generating a Jitter Signature from a selected subset of Jitter Ratios.

9. The method of claim 8, wherein the selected subset of Jitter Ratios includes those Jitter Ratios which indicate at least one predefined range of deviations from an ideal distance between the associated first and second points.

10. The method of claim 9, wherein a first predefined range of deviations includes deviations which exceed a predefined value, and a second predefined range of deviations include deviations which do not exceed the predefined value.

11. The method of claim 1, further including the step of calculating a Jitter Ratio, the Jitter Ratio being proportional to the distance between the first and second points.

12. The method of claim 11, wherein detectable points are ideally stored on the storage medium at regular intervals of either one bit cell or one half bit cell in length and the distance between the leading and trailing read apparatus is equal to an odd multiple of one half the length of one bit cell.

13. The method of claim 12, wherein the distance between the leading and trailing read apparatus is equal to one half the length of one bit cell.

14. The method of claim 11 wherein calculating the Jitter Ratio includes the step of dividing the Jitter Value by the Reference Value.

15. The method of claim 14, further including the step of calculating the distance between the first and second points.

16. The method of claim 15, wherein the step of calculating the distance between the first and second points includes the step of multiplying the Jitter Ratio by the distance between the leading and trailing read apparatus.

17. The method of claim 11, wherein the leading and trailing read apparatus is a magnetic read head.

18. The method of claim 17, wherein the magnetic read head includes a pickup coil and a zero crossing detector.

19. The method of claim 18, wherein the magnetic read head further includes a current amplifier.

20. The method of claim 11, wherein each of the steps are repeated for each of a plurality of pairs of first and second points, such that a list of Jitter Ratios is produced, each Jitter Ratio being proportional to the distance between each of the pairs of first and second points stored on the storage medium.

21. The method of claim 20, further including the step of multiplying each Jitter Ratio by the distance between the leading and trailing read apparatus to determine the distance between each pair of first and second points.

22. The method of claim 1, further including the steps of:
    (a) detecting a reference point before the detection of the first and second points at the leading read apparatus;
    (b) setting a count value in response to the detection of the reference point;
    (c) incrementing the count value each time a point is detected at either the leading or trailing read apparatus;
    (d) storing the measured Reference Value together with the present count value at the time the second point is detected at the leading read apparatus; and
    (e) storing the measured Jitter Value together with the present count value at the time the first point is detected at the trailing read apparatus.

23. The method of claim 22, further including the step of generating a Jitter Ratio after both the Reference Value and the Jitter Value have been stored.

24. The method of claim 23, further including the step of storing the Jitter Ratio together with the count value present at the time the first point is detected at the trailing read apparatus.

25. A method for correcting the location of a transition from a first logical state to a second logical state stored on a storage medium in which each correctly located transition is located a predetermined distance from a preceding correctly located transition, and a first correctly located transition and a second transition are detectable by a leading and trailing read apparatus as the first and second transitions move past the leading and trailing read apparatus, the leading and trailing read apparatus being spaced apart a known distance, including the steps of:
    (a) detecting the first correctly located transition as the first transition moves past the leading read apparatus;
    (b) detecting the second transition as the second transition moves past the leading read apparatus,
    (c) detecting the first transition as the first point moves past the trailing read apparatus;
    (d) measuring a jitter Value starting from the detection of the first transition at the leading read apparatus and ending upon detection of the second transition at the leading read apparatus; and
    (e) measuring a Reference Value starting from the detection of the first transition at the leading read apparatus and ending upon detection of the first transition at the trailing read apparatus;
    (f) calculating the distance between the first and second transitions based upon the Reference Value and the Jitter Value;
    (g) comparing the calculated distance with the correct distance to determine a location error;
    (h) if the location error is greater than a predetermined value, then rewriting the second transition at the correct location.

26. An apparatus for characterizing the distance between a first point and a second point stored upon a storage medium, the apparatus including:
    (a) a first read apparatus:
    (b) a second read apparatus spaced a predetermined distance from the first read apparatus;
    (c) acounter for measuring a Reference Value which elapsed between detection of the first point at the first read apparatus and detection of the first point at the second read apparatus, and for measuring a Jitter Value which elapsed between detection of the first point at the first read apparatus and detection of the second point at the second read apparatus; and
    (d) a processing device for determining the quotient of the Jitter Value divided by the Reference Value.

* * * * *